US00RE49564E

(19) United States
(12) Reissued Patent
Kim et al.

(10) Patent Number: US RE49,564 E
(45) Date of Reissued Patent: Jun. 27, 2023

(54) METHOD AND APPARATUS FOR WIRELESS POWER TRANSMISSION WITH HARMONIC NOISE CANCELLATION

(71) Applicant: SAMSUNG ELECTRONICS CO., LTD., Suwon-si (KR)

(72) Inventors: Dong Zo Kim, Yongin-si (KR); Sang Wook Kwon, Seongnam-si (KR); Ki Young Kim, Yongin-si (KR); Bong Chui Kim, Seoul (KR); Yun Kwon Park, Dongducheon-si (KR); Jae Hyun Park, Yongin-si (KR); Keum Su Song, Seoul (KR); Chi Hyung Ahn, Suwon-si (KR); Young Ho Ryu, Yongin-si (KR); Byoung Hee Lee, Yongin-si (KR)

(73) Assignee: SAMSUNG ELECTRONICS CO., LTD., Suwon-si (KR)

(21) Appl. No.: 17/139,943

(22) Filed: Dec. 31, 2020

Related U.S. Patent Documents

Reissue of:
(64) Patent No.: 10,312,735
Issued: Jun. 4, 2019
Appl. No.: 14/478,169
Filed: Sep. 5, 2014

(30) Foreign Application Priority Data

Sep. 9, 2013 (KR) ..... 10-2013-0107844

(51) Int. Cl.

| | |
|---|---|
| ***H02J 5/00*** | (2016.01) |
| ***H02J 50/12*** | (2016.01) |
| ***H02J 50/40*** | (2016.01) |
| ***H02J 7/02*** | (2016.01) |
| ***H01F 38/14*** | (2006.01) |
| ***H02J 7/00*** | (2006.01) |
| ***H02J 50/80*** | (2016.01) |

(52) U.S. Cl.
CPC ..... *H02J 7/00714* (2020.01); *H02J 50/12* (2016.02); *H02J 50/80* (2016.02); *H01F 38/14* (2013.01); *H02J 50/40* (2016.02)

(58) Field of Classification Search
CPC .. H02J 50/12; H02J 5/005; H02J 7/025; H02J 50/40; H02F 38/14
See application file for complete search history.

(56) References Cited

U.S. PATENT DOCUMENTS 4,656,434 A * 4/1987 Selin ..... H03F 3/602 330/124 R
4,772,856 A * 9/1988 Nojima ..... H03F 3/602 330/124 R
6,133,788 A * 10/2000 Dent ..... H03F 1/0294 330/124 R
6,285,251 B1 * 9/2001 Dent ..... H02M 3/1582 330/124 R (Continued)

*Primary Examiner* — Woo H Choi
(74) *Attorney, Agent, or Firm* — Nixon & Vanderhye, P.C.

(57) ABSTRACT

A wireless power transmission apparatus includes a source resonator configured to transmit an output power from which a harmonic component has been cancelled to a wireless power reception apparatus by resonating with a target resonator of the wireless power transmission apparatus, and a resonant power generator configured to differentially input a first input signal and a second input signal to the source resonator, and cancel the harmonic component of the output power.

14 Claims, 18 Drawing Sheets

(56) References Cited

U.S. PATENT DOCUMENTS 8,180,303 B2 * 5/2012 Dupuy ..... H03F 1/0222 330/295
8,928,413 B1 * 1/2015 Cripe ..... H03F 3/2176 330/295
2005/0237112 A1 * 10/2005 Petrovic ..... H03F 1/3211 330/149
2006/0001487 A1 * 1/2006 Petrovic ..... H03F 1/26 330/149
2006/0006949 A1 * 1/2006 Burns ..... H03F 3/211 330/301
2006/0022756 A1 * 2/2006 Kitlinski ..... H01L 23/66 330/307
2006/0068748 A1 * 3/2006 Irie ..... H03D 7/145 455/333
2007/0222697 A1 * 9/2007 Caimi ..... H01Q 1/243 343/861
2011/0255575 A1 * 10/2011 Zhu ..... H04B 1/0475 375/219
2012/0328043 A1 * 12/2012 Kwon ..... H04B 5/0081 375/295
2013/0080091 A1 * 3/2013 Kwon ..... G06K 19/0712 702/60
2013/0099860 A1 4/2013 Shiikuma et al.
2013/0175872 A1 * 7/2013 Simon ..... H02J 5/005 307/104
2013/0207741 A1 * 8/2013 Presti ..... H03H 7/48 333/111
2013/0271222 A1 * 10/2013 Choi ..... H03F 1/565 330/295
2013/0278071 A1 * 10/2013 Komiyama ..... H04B 5/0037 307/104
2014/0161159 A1 * 6/2014 Black ..... H04N 5/0037 307/104
2014/0246916 A1 * 9/2014 Von Novak ..... H02J 17/00 307/104
2015/0015338 A1 * 1/2015 Okada ..... H03F 3/1278 330/277
2015/0246614 A1 * 9/2015 Dames ..... B60L 5/005 191/10

* cited by examiner (a)

(b)

METHOD AND APPARATUS FOR WIRELESS POWER TRANSMISSION WITH HARMONIC NOISE CANCELLATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims the benefit under 35 USC 119(a) of Korean Patent Application No. 10-2013-0107844 filed on Sep. 9, 2013, in the Korean Intellectual Property Office, the entire disclosure of which is incorporated herein by reference for all purposes.

BACKGROUND

Field

The following description relates to a method and apparatus of wireless power transmission for cancelling harmonic noise.

Description of Related Art

A wireless power refers to energy transmitted to a power receiving unit (PRU) from a power transmitting unit (PTU) via a magnetic resonant coupling. Accordingly, a wireless power transmission system or a wireless power charging system may include a source device for wirelessly transmitting a power and a target device for wirelessly receiving a power. The source device may be referred to as a source or the PTU. Also, the target device may be referred to as a target or the PRU.

The source device may be provided with a source resonator, and the target device may be provided with a target resonator. For example, a magnetic coupling or a resonant coupling may be formed between the source resonator and the target resonator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless power transmission apparatus includes a source resonator configured to transmit an output power from which a harmonic component has been cancelled to a wireless power reception apparatus by resonating with a target resonator of the wireless power reception apparatus; and a resonant power generator configured to differentially input a first input signal and a second input signal to the source resonator, and cancel the harmonic component of the output power.

The resonant power generator may include a first power amplifier configured to generate the first input signal; and a second power amplifier configured to generate the second input signal.

The resonant power generator may further include a first driving circuit coupled to the first power amplifier; and a second driving circuit coupled to the second power amplifier.

The first driving circuit and the second driving circuit may be configured to generate a 180 degree phase difference between the first input signal and the second input signal.

The first power amplifier may include a first notch filter; the second power amplifier may include a second notch filter; and the resonant power generator may be further configured to cancel a third harmonic component of the output power using the first notch filter and the second notch filter.

The first notch filter and the second notch filter may be configured to match an output impedance of the wireless power transmission apparatus to an input impedance of the wireless power reception apparatus.

The first power amplifier and the second power amplifier may be Class-E amplifiers.

The resonant power generator may be further configured to cancel an even-order harmonic component of the output power.

The apparatus may further include a low-pass filter (LPF) configured to cancel a fifth or higher odd-order harmonic component of the output power; and the source resonator may be further configured to transmit the output power from which the fifth or higher odd-order harmonic component has been cancelled to the wireless power reception apparatus.

The source resonator may be further configured to receive the first input signal and the second input signal via a differential input port including a separate grounding unit.

In another general aspect, a wireless power transmission apparatus includes a source resonator configured to transmit an output power to a wireless power reception apparatus by resonating with a target resonator of the wireless power reception apparatus; a resonant power generator including a first power amplifier including a first notch filter and configured to generate a first input signal, and a second power amplifier including a second notch filter and configured to generate a second input signal, wherein the resonant power generator is configured to cancel an even-order harmonic component of the output power by differentially inputting the first input signal and the second input signal to the source resonator, and cancel a third harmonic component of the output power using the first notch filter and the second notch filter; and a low-pass filter (LPF) configured to cancel a fifth or higher odd-order harmonic component of the output power; wherein the source resonator may be further configured to transmit, to the wireless power reception apparatus, the output power from which the even-order harmonic component, the third harmonic component, and the fifth or higher odd-order harmonic component have been cancelled.

In another general aspect, a wireless power transmission method includes differentially inputting a first input signal and a second input signal to a source resonator; cancelling a harmonic component of an output power of the source resonator; and transmitting the output power from which the harmonic component has been cancelled to a wireless power reception apparatus by resonating with a target resonator of the wireless power reception apparatus.

The cancelling of the harmonic component of the output power may include generating the first input signal using a first power amplifier; and generating the second input signal using a second power amplifier.

The cancelling of the harmonic component of the output power may further include generating a 180 degree phase difference between the first input signal and the second input signal using a first driving circuit coupled to the first power amplifier and a second driving circuit coupled to the second power amplifier.

The first output amplifier may include a first notch filter; the second output amplifier may include a second notch filter; and the cancelling of the harmonic component of the output power may further include cancelling a third harmonic component of the output power using the first notch filter and the second notch filter.

The first notch filter and the second notch filter may be configured to match an output impedance of the wireless power transmission apparatus to an input impedance of the wireless power reception apparatus.

The cancelling of the harmonic component of the output power may include cancelling an even-order harmonic component of the output power.

The method may further include cancelling a fifth or higher odd-order harmonic component of the output power using a low-pass filter (LPF); and the transmitting of the output power to an apparatus for wireless power reception may include transmitting the output power from which the fifth or higher odd-order harmonic component has been cancelled to the wireless power reception apparatus.

In another general aspect, a non-transitory computer-readable storage medium stores instructions for controlling a computer to perform the method described above.

In another general aspect, a wireless power transmitter includes a source resonator configured to transmit an output power to a wireless power receiver by resonating with a target resonator of the wireless power receiver; and a harmonic noise canceller configured to cancel harmonic components of the output power by a plurality of different methods so that the output power transmitted by the source resonator is free of the harmonic components.

The harmonic noise canceller may include a first harmonic component canceller configured to cancel even-order harmonic components of the output power; a second harmonic component canceller configured to cancel a third harmonic component of the output power; and a third harmonic component canceller configured to cancel fifth and higher odd-order harmonic components of the output power.

The first harmonic component canceller may be further configured to generate a first input signal and a second input signal having a 180 degree phase difference with respect to the first input signal; the source resonator may include a differential input port configured to receive the first input signal and the second input signal; and the 180 phase difference between the first input signal and the second input signal generated by the first harmonic canceller may result in cancellation of the even-order harmonic components of the output power at the differential input port.

The second harmonic component canceller may include a first notch filter configured to remove the third harmonic component from the first input signal; and a second notch filter configured to remove the third harmonic component from the first input signal.

The third harmonic component canceller may include a low-pass filter (LPF) configured to remove the fifth and higher odd-order harmonic components from the first input signal and the second input signal.

Other features and aspects will be apparent from the following detailed description, the drawings, and the claims.

DETAILED DESCRIPTION

Figure 1:
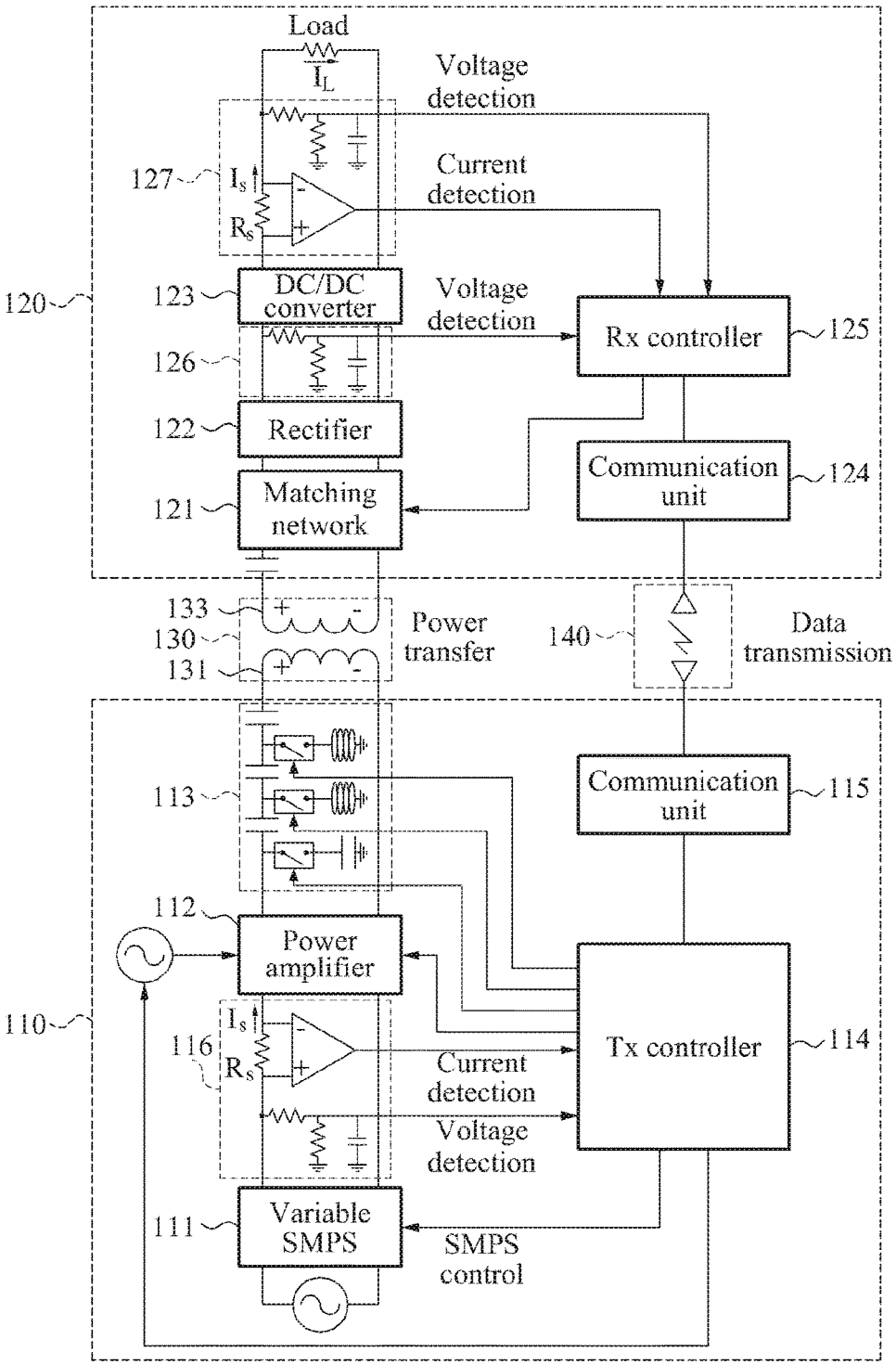
FIG. 1 illustrates an example of a wireless power transmission and reception system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

FIG. 1 illustrates an example of a wireless power transmission and reception system.

Referring to FIG. 1, the wireless power transmission system includes a source 110 and a target 120. The source 110 is a device configured to supply a wireless power, and may be any electronic device capable of supplying a power, for example, a pad, a terminal, a tablet personal computer (PC), a television (TV), a medical device, or an electric vehicle. The target 120 is a device configured to receive a wireless power, and may be any electronic device requiring a power to operate, for example, a pad, a terminal, a tablet PC, a smart watch, a medical device, an electric vehicle, a washing machine, a radio, or a lighting system.

The source 110 includes a variable switching mode power supply (SMPS) 111, a power amplifier (PA) 112, a matching network 113, a transmission (Tx) controller 114 (for example, Tx control logic), a communication unit 115, and a power detector 116.

The variable SMPS 111 generates a direct current (DC) voltage by switching an alternating current (AC) voltage having a frequency in a band of tens of hertz (Hz) output from a power supply. The variable SMPS 111 may output a fixed DC voltage, or may output an adjustable DC voltage that may be adjusted under the control of the Tx controller 114.

The variable SMPS 111 may control its output voltage supplied to the PA 112 based on a level of a power output from the PA 112 so that the PA 112 may operate in a saturation region with a high efficiency at all times, thereby enabling a maximum efficiency to be maintained at all levels of the output power of the PA 112. The PA 112 may be, for example, a Class-E amplifier.

If a fixed SMPS is used instead of the variable SMPS 111, a variable DC-to-DC (DC/DC) converter may be needed. In this example, the fixed SMPS outputs a fixed DC voltage to the variable DC/DC converter, and the variable DC/DC converter controls its output voltage supplied to the PA 112 based on the level of the power output from the PA 112 so that the PA 112, which may be a Class-E amplifier, may operate in the saturation region with a high efficiency at all times, thereby enabling the maximum efficiency to be maintained at all levels of the output power of the PA 112.

The power detector 116 detects an output current and an output voltage of the variable SMPS 111, and transmits, to the Tx controller 114, information on the detected output current and the detected output voltage. Also, the power detector 116 may detect an input current and an input voltage of the PA 112.

The PA 112 generates a power by converting a DC voltage having a predetermined level supplied to the PA 112 by the variable SMPS 111 to an AC voltage using a switching pulse signal having a frequency in a band of a few megahertz (MHz) to tens of MHz. For example, the PA 112 may convert the DC voltage supplied to the PA 112 to an AC voltage having a reference resonant frequency $F_{Ref}$, and may generate a communication power used for communication, and/or a charging power used for charging. The communication power and the charging power may be used in a plurality of targets.

If a high power from a few kilowatts (kW) to tens of kW is transmitted using a resonant frequency in a band of tens of kilohertz (kHz) to hundreds of kHz, the PA 112 may be omitted, and a power may be supplied to a source resonator 131 from the variable SMPS 111 or a high-power power supply. For example, an inverter may be used in lieu of the PA 112. The inverter may convert a DC power supplied from the high-power power supply to an AC power. In particular, the inverter may convert the power by converting a DC voltage having a predetermined level to an AC voltage using a switching pulse signal having a frequency in a band of tens of kHz to hundreds of kHz. For example, the inverter may convert the DC voltage having the predetermined level to an AC voltage having a resonant frequency of the source resonator 131 in a band of tens of kHz to hundreds of kHz.

As used herein, the term "communication power" refers to a low power of 0.1 milliwatt (mW) to 1 mW. The term "charging power" refers to a high power of a few mW to tens of kW consumed by a load of a target. As used herein, the term "charging" refers to supplying a power to a unit or element configured to charge a battery or other rechargeable device. Additionally, the term "charging" refers to supplying a power to a unit or element configured to consume a power. For example, the term "charging power" may refer to a power consumed by a target while operating, or a power used to charge a battery of the target. The unit or element may be, for example, a battery, a display, a sound output circuit, a main processor, or any of various types of sensors.

As used herein, the term "reference resonant frequency" refers to a resonant frequency nominally used by the source 110, and the term "tracking frequency" refers to a resonant frequency used by the source 110 that has been adjusted based on a preset scheme.

The Tx controller 114 may detect a reflected wave of the communication power or the charging power, and may detect mismatching that occurs between a target resonator 133 and the source resonator 131 based on the detected reflected wave. To detect the mismatching, for example, the Tx controller 114 may detect an envelope of the reflected wave, a power amount of the reflected wave, or any other characteristic of the reflected wave that is affected by mismatching.

The matching network 113 compensates for impedance mismatching between the source resonator 131 and the target resonator 133 to achieve optimal matching under the control of the Tx controller 114. The matching network 113 includes at least one inductor and at least one capacitor each connected to a respective switch controlled by the Tx controller 114.

If a high power is to be transmitted using a resonant frequency in a band of tens of kHz to hundreds of kHz, the matching network 113 may be omitted from the source 110 because the effect of the matching network 113 may be reduced when transmitting the high power.

The Tx controller 114 may calculate a voltage standing wave ratio (VSWR) based on a level of an output voltage of the source resonator 131 or the PA 112 and a voltage level of the reflected wave. In one example, if the VSWR is greater than a predetermined value, the Tx controller 114 may determine that a mismatch is detected between the source resonator 131 and the target resonator 133.

In another example, if the Tx controller 114 detects that the VSWR is greater than the predetermined value, the Tx controller 114 may calculate a wireless power transmission efficiency for each of N tracking frequencies, determine a tracking frequency $F_{Best}$ providing the best wireless power transmission efficiency among the N tracking frequencies, and adjust the reference resonant frequency $F_{Ref}$ to the tracking frequency $F_{Best}$. The N tracking frequencies may be set in advance.

The Tx controller 114 may adjust a frequency of the switching pulse signal used by the PA 112. The frequency of the switching pulse signal may be determined under the control of the Tx controller 114. For example, the Tx controller 114 may generate a modulated signal to be transmitted to the target 120 by controlling the PA 112. The communication unit 115 may transmit a variety of data to the target 120 using in-band communication. The Tx controller 114 may also detect a reflected wave, and may demodulate a signal received from the target 120 from an envelope of the detected reflected wave.

The Tx controller 114 may generate a modulated signal for in-band communication using various methods. For example, the Tx controller 114 may generate the modulated signal by turning on or off a switching pulse signal used by the PA 112, by performing delta-sigma modulation, or by any other modulation method known to one of ordinary skill in the art. Additionally, the Tx controller 114 may generate a pulse-width modulated (PWM) signal having a predetermined envelope.

The Tx controller 114 may determine an initial wireless power to be transmitted to the target 120 based on a change in a temperature of the source 110, a battery state of the target 120, a change in an amount of a power received by the target 120, and/or a change in a temperature of the target 120.

The source 110 may further include a temperature measurement sensor (not illustrated) configured to detect a change in a temperature of the source 110. The source 110 may receive from the target 120 information regarding the battery state of the target 120, the change in the amount of the power received by the target 120, and/or the change in the temperature of the target 120 by communicating with the target 120. The source 110 may detect the change in the temperature of the target 120 based on the information received from the target 120.

The Tx controller 114 may adjust a voltage supplied to the PA 112 based on the change in the temperature of the target 120 using a lookup table (LUT). The LUT may store a level of the voltage to be supplied to the PA 112 based on the change in the temperature of the source 110. For example, when the temperature of the source 110 rises, the Tx controller 114 may reduce the voltage to be supplied to the PA 112 by controlling the variable SMPS 111.

The communication unit 115 may perform out-of-band communication using a separate communication channel. The communication unit 115 may include a communication module, such as a ZigBee module, a Bluetooth module, or any other communication module known to one of ordinary skill in the art, that the communication unit 115 may use to transmit and receive data 140 to and from the target 120 via the out-of-band communication.

The source resonator 131 transmits electromagnetic energy 130 to the target resonator 133. For example, the source resonator 131 may transmit the communication power or the charging power to the target 120 via a magnetic coupling with the target resonator 133.

The source resonator 131 may be made of a superconducting material. Also, although not shown in FIG. 1, the source resonator 131 may be disposed in a container of refrigerant to enable the source resonator 131 to maintain a superconducting state. A heated refrigerant that has transitioned to a gaseous state may be liquefied to a liquid state by a cooler. The target resonator 133 may also be made of a superconducting material. In this instance, the target resonator 133 may also be disposed in a container of refrigerant to enable the target resonator 133 to maintain a superconducting state.

As illustrated in FIG. 1, target 120 includes a matching network 121, a rectifier 122, a DC/DC converter 123, a communication unit 124, a reception (Rx) controller 125 (for example, Rx control logic), a voltage detector 126, and a power detector 127.

The target resonator 133 receives the electromagnetic energy 130 from the source resonator 131. For example, the target resonator 133 may receive the communication power or the charging power from the source 110 via a magnetic coupling with the source resonator 131. Additionally, the target resonator 133 may receive data from the source 110 via the in-band communication.

The target resonator 133 may receive the initial wireless power determined by the Tx controller 114 based on the change in the temperature of the source 110, the battery state of the target 120, the change in the amount of the power received by the target 120, and/or the change in the temperature of the target 120.

The matching network 121 matches an input impedance viewed from the source 110 to an output impedance viewed from a load of the target 120. The matching network 121 may be configured to have at least one capacitor and at least one inductor.

The rectifier 122 generates a DC voltage by rectifying an AC voltage received by the target resonator 133.

The DC/DC converter 123 adjusts a level of the DC voltage output from the rectifier 122 based on a voltage required by the load. As an example, the DC/DC converter 123 may adjust the level of the DC voltage output from the rectifier 122 to a level in a range of 3 volts (V) to 10 V.

The voltage detector 126 detects a voltage of an input terminal of the DC/DC converter 123, and the power detector 127 detects a current and a voltage of an output terminal of the DC/DC converter 123. The detected voltage of the input terminal may be used to calculate a wireless power transmission efficiency of the power received from the source 110. The detected current and the detected voltage of the output terminal may be used by the Rx controller 125 to calculate an amount of a power actually transferred to the load. The Tx controller 114 of the source 110 may calculate an amount of a power that needs to be transmitted by the source 110 to the target 120 based on an amount of a power required by the load and the amount of the power actually transferred to the load.

If the amount of the power actually transferred to the load calculated by the Rx controller 125 is transmitted to the source 110 by the communication unit 124, the Tx controller 114 may calculate the amount of the power that needs to be transmitted to the target 120, and may control either one or both of the variable SMPS 111 and the PA 112 to generate an amount of power that will enable the calculated amount of power to be transmitted by the source 110.

The Rx controller 125 may perform in-band communication to transmit and receive data to and from the source 110 using a resonant frequency. During the in-band communication, the Rx controller 125 may demodulate a received signal by detecting a signal between the target resonator 133 and the rectifier 122, or detecting an output signal of the rectifier 122. In particular, the Rx controller 125 may demodulate a message received via the in-band communication.

Additionally, the Rx controller 125 may adjust an input impedance of the target resonator 133 using the matching network 121 to modulate a signal to be transmitted to the source 110. For example, the Rx controller 125 may adjust the matching network 121 to increase the input impedance of the target resonator 133 so that a reflected wave will be detected by the Tx controller 114 of the source 110. Depending on whether the reflected wave is detected, the Tx controller 114 of the source 110 may detect a first value, for example, a binary number "0," or a second value, for example, a binary number "1." For example, when the reflected wave is detected, the Tx controller 114 may detect "0", and when the reflected wave is not detected, the Tx controller 114 may detect "1". Alternatively, when the reflected wave is detected, the Tx controller 114 may detect "1", and when the reflected wave is not detected, the Tx controller 114 may detect "0".

The communication unit 124 of the target 120 may transmit a response message to the communication unit 115 of the source 110. For example, the response message may include any one or any combination of a product type of the target 120, manufacturer information of the target 120, a model name of the target 120, a battery type of the target 120, a charging scheme of the target 120, an impedance value of a load of the target 120, information on characteristics of the target resonator 133 of the target 120, information on a frequency band used by the target 120, an amount of a power consumed by the target 120, an identifier (ID) of the target 120, product version information of the target 120, standard information of the target 120, and any other information about the target 120.

The communication unit 124 may perform out-of-band communication using a separate communication channel. For example, the communication unit 124 may include a communication module, such as a ZigBee module, a Bluetooth module, or any other communication module known to one of ordinary skill in the art that the communication unit 124 may use to transmit and receive the data 140 to and from the source 110 via the out-of-band communication.

The communication unit 124 may receive a wake-up request message from the source 110, and the power detector 127 may detect an amount of a power received by the target resonator 133. The communication unit 124 may transmit to the source 110 information on the detected amount of the power received by the target resonator 133. The information on the detected amount of the power received by the target resonator 133 may include, for example, an input voltage value and an input current value of the rectifier 122, an output voltage value and an output current value of the rectifier 122, an output voltage value and an output current value of the DC/DC converter 123, and any other information about the detected amount of the power received by the target resonator 133.

In the following description of FIGS. 2 through 4, unless otherwise indicated, the term "resonator" may refer to both a source resonator and a target resonator. The resonator of FIGS. 2A through 4B may be used as the resonators described with respect to FIGS. 1 and 5 through 11.

Figure 2A:
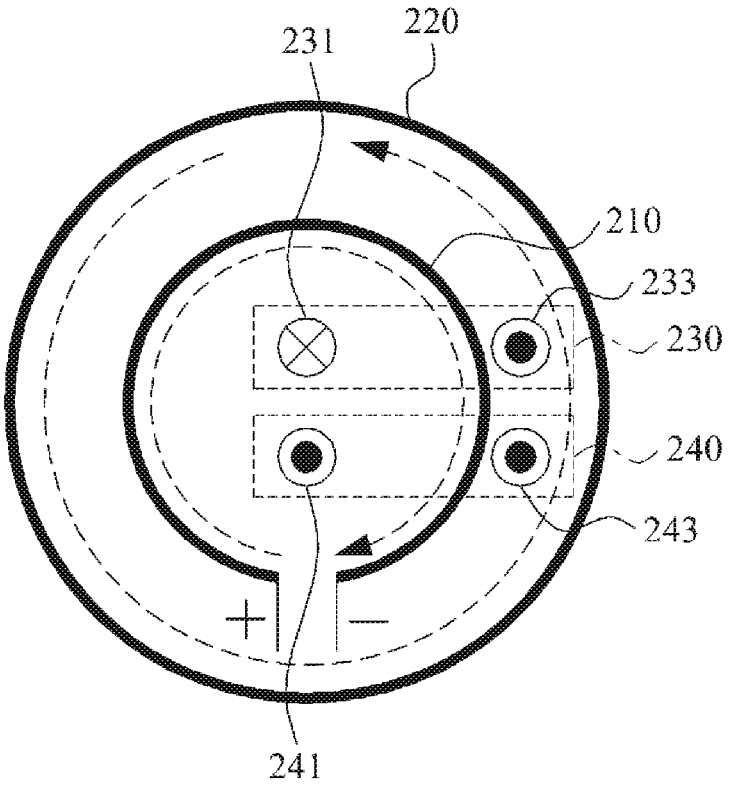
FIGS. 2A and 2B illustrate examples of a distribution of a magnetic field in a resonator and a feeder.
Figure 2B:
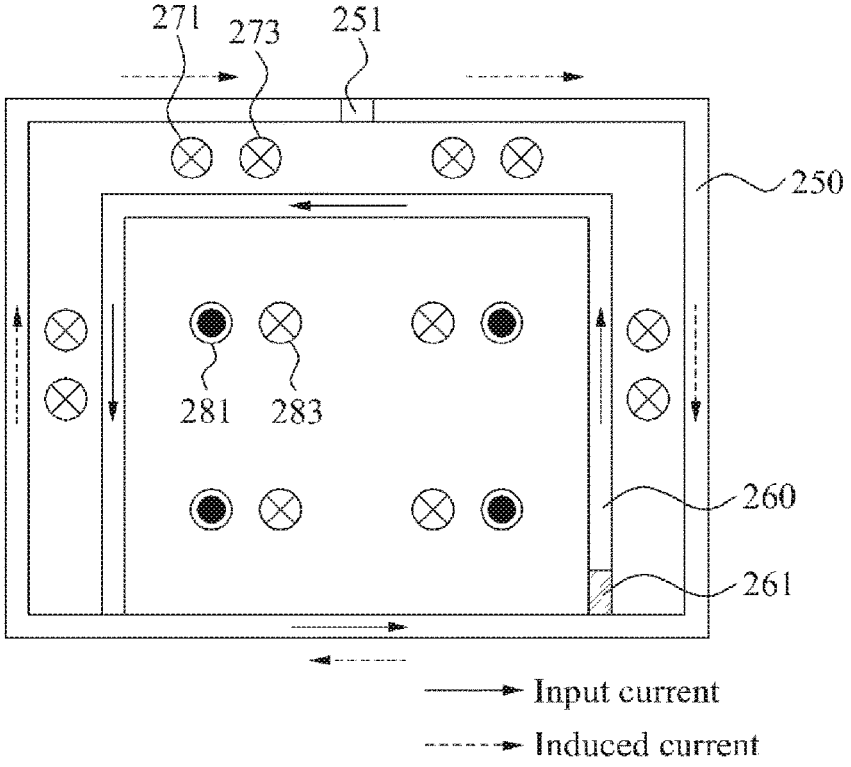

FIGS. 2A and 2B illustrate examples of a distribution of a magnetic field in a resonator and a feeder.

When a power is supplied to a resonator through a separate feeder, a magnetic field is generated in both the feeder and the resonator.

A source resonator and a target resonator may each have a dual loop structure including an external loop and an internal loop.

FIG. 2A illustrates an example of a structure of a wireless power transmitter in which a feeder 210 and a resonator 220 do not have a common ground. Referring to FIG. 2A, when an input current flows into the feeder 210 through a terminal labeled "+" and out of the feeder 210 through a terminal labeled "−", a magnetic field 230 is generated by the input current. A direction 231 of the magnetic field 230 inside the feeder 210 is into the plane of FIG. 2A, and is opposite to a direction 233 of the magnetic field 230 outside the feeder 210, which is out of the plane of FIG. 2A. The magnetic field 230 generated by the feeder 210 induces a current in the resonator 220. A direction of the induced current in the resonator 220 is opposite to a direction of the input current in the feeder 210 as indicated by the dashed lines with arrowheads in FIG. 2A.

The induced current in the resonator 220 generates a magnetic field 240. Directions of the magnetic field 240 generated by the resonator 220 are the same at all positions inside the resonator 220, and are out of the plane of FIG. 2A. Accordingly, a direction 241 of the magnetic field 240 generated by the resonator 220 inside the feeder 210 is the same as a direction 243 of the magnetic field 240 generated by the resonator 220 outside the feeder 210.

Consequently, when the magnetic field 230 generated by the feeder 210 and the magnetic field 240 generated by the resonator 220 are combined, a strength of the total magnetic field decreases inside the feeder 210, but increases outside the feeder 210. Accordingly, when a power is supplied to the resonator 220 via the feeder 210 in the structure of FIG. 2A, the strength of the total magnetic field decreases in the portion of the resonator 220 inside the feeder 210, but increases in the portion of the resonator 220 outside the feeder 210. When a distribution of the magnetic field in the resonator 220 is random or not uniform, performing impedance matching may be difficult because an input impedance may frequently vary. Also, when the strength of the total magnetic field increases, a wireless power transmission efficiency increases. Conversely, when the strength of the total magnetic field decreases, the wireless power transmission efficiency decreases. Accordingly, the wireless power transmission may be reduced on average.

FIG. 2B illustrates an example of a structure of a wireless power transmitter in which a resonator 250 and a feeder 260 have a common ground. The resonator 250 includes a capacitor 251. The feeder 260 receives a radio frequency (RF) signal via a port 261. When the RF signal is input to the feeder 260, an input current is generated in the feeder 260. The input current flowing in the feeder 260 generates a magnetic field, and a current is induced in the resonator 250 by the magnetic field. Also, another magnetic field is generated by the induced current flowing in the resonator 250. In this example, a direction of the input current flowing in the feeder 260 is opposite to a direction of the induced current flowing in the resonator 250. Accordingly, the strength of the total magnetic field increases in a region between the resonator 250 and the feeder 260 because a direction 271 of the magnetic field generated by the input current is the same as a direction 273 of the magnetic field generated by the induced current in the region between the resonator 250 and the feeder 260. Conversely, the strength of the total magnetic field decreases inside the feeder 260 because a direction 281 of the magnetic field generated by the input current is opposite to a direction 283 of the magnetic field generated by the induced current. Therefore, the strength of the total magnetic field decreases in the portion of the resonator 250 inside the feeder 260, i.e., a center of the resonator 250, but increases in the portion of the resonator 250 outside the feeder 260, i.e., near an outer periphery of the resonator 250.

An input impedance may be adjusted by adjusting an internal area of the feeder 260. The input impedance refers to an impedance viewed in a direction from the feeder 260 to the resonator 250. When the internal area of the feeder 260 increases, the input impedance increases, and when the internal area of the feeder 260 decreases, the input impedance decreases. However, if the magnetic field is randomly or not uniformly distributed in the resonator 250, the input impedance may vary based on a location of a target even if the internal area of the feeder 260 has been adjusted to adjust the input impedance to match an output impedance of a power amplifier for a specific location of the target device. Accordingly, a separate matching network may be needed to match the input impedance to the output impedance of the power amplifier. For example, when the input impedance increases, a separate matching network may be needed to match the increased input impedance to a relatively low output impedance of the power amplifier.

Figure 3A:
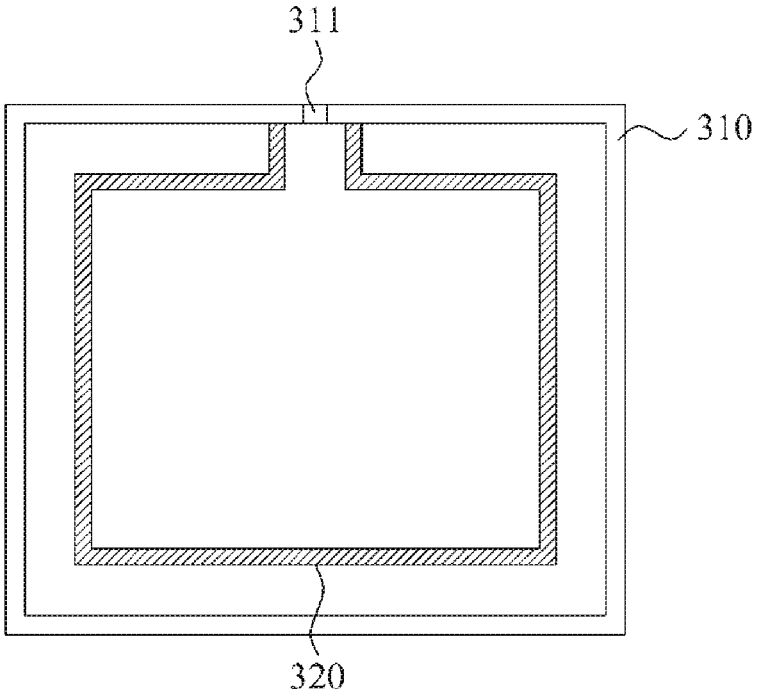
FIGS. 3A and 3B illustrate examples of a configuration of a resonator and a feeder.
Figure 3B:
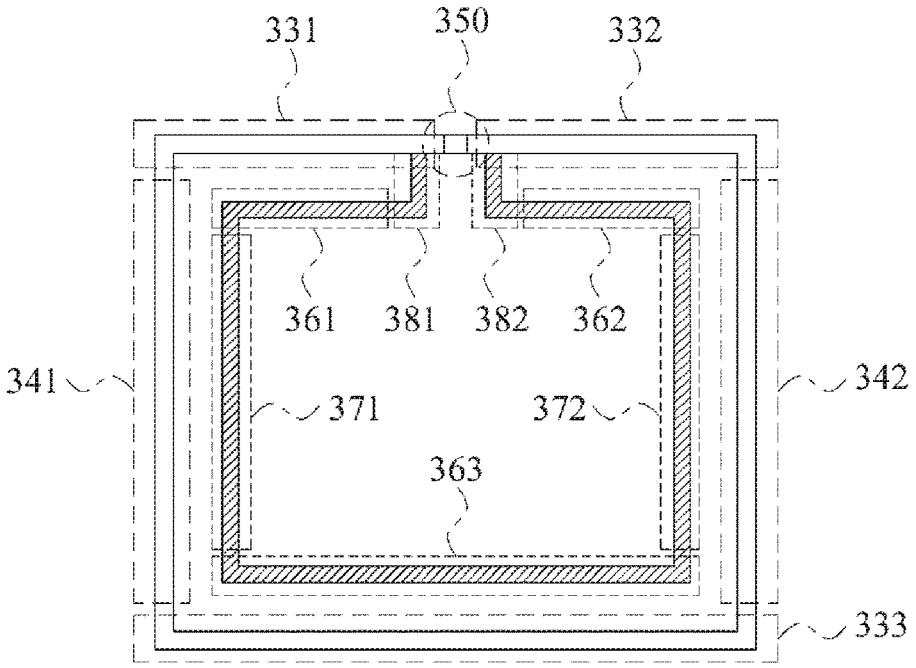

FIGS. 3A and 3B illustrate examples of a configuration of a resonator and a feeder.

Referring to FIG. 3A, a resonator 310 includes a capacitor 311. A feeder 320 is electrically connected to both ends of the capacitor 311.

FIG. 3B illustrates the structure of FIG. 3A in greater detail. The resonator 310 includes a first transmission line (not identified by a reference numeral in FIG. 3B, but formed by various elements in FIG. 3B as discussed below), a first conductor 341, a second conductor 342, and at least one capacitor 350.

The capacitor 350 is connected in series between a first signal conducting portion 331 and a second signal conducting portion 332 in the first transmission line, causing an electric field to be confined in the capacitor 350. In general, a transmission line includes at least one conductor disposed in an upper portion of the transmission line, and at least one conductor disposed in a lower portion of the transmission line. A current may flow through the at least one conductor disposed in the upper portion of the transmission line, and the at least one conductor disposed in the lower portion of the transmission line may be electrically grounded. In the example in FIG. 3B, a conductor disposed in the upper portion of the first transmission line is separated into two portions that will be referred to as the first signal conducting portion 331 and the second signal conducting portion 332, and a conductor disposed in the lower portion of the first transmission line will be referred to as a first ground conducting portion 333.

As shown in FIG. 3B, the resonator 310 has a generally two-dimensional (2D) structure. The first transmission line includes the first signal conducting portion 331 and the second signal conducting portion 332 disposed in the upper portion of the first transmission line, and the first ground conducting portion 333 disposed in the lower portion of the first transmission line. The first signal conducting portion 331 and the second signal conducting portion 332 are disposed to face the first ground conducting portion 333. A current flows through the first signal conducting portion 331 and the second signal conducting portion 332.

Also, as shown in FIG. 3B, one end of the first signal conducting portion 331 is connected to one end of the first conductor 341, the other end of the first signal conducting portion 331 is connected to one end of the capacitor 350, and the other end of the first conductor 341 is connected to one end of the first ground conducting portion 333. One end of the second signal conducting portion 332 is connected to one end of the second conductor 342, the other end of the second signal conducting portion 332 is connected to the other end of the capacitor 350, and the other end of the second conductor 342 is connected to the other end of the first ground conducting portion 333. Accordingly, the first signal conducting portion 331, the second signal conducting portion 332, the first ground conducting portion 333, the first conductor 341, and the second conductor 342 are connected to one another, causing the resonator 310 to have an electrically closed loop structure. The term "loop structure" includes a polygonal structure, a circular structure, a rectangular structure, and any other geometrical structure that is closed, i.e., a geometrical structure that does not have any opening in its perimeter. The expression "having a loop structure" indicates a structure that is electrically closed.

The capacitor 350 is inserted into an intermediate portion of the first transmission line. In the example in FIG. 3B, the capacitor 350 is inserted between the first signal conducting portion 331 and the second signal conducting portion 332. The capacitor 350 may be a lumped element capacitor, a distributed element capacitor, or any other type of capacitor known to one of ordinary skill in the art. For example, a distributed element capacitor may include zigzagged conductor lines and a dielectric material having a high permittivity disposed between the zigzagged conductor lines.

The capacitor 350 inserted into the first transmission line may cause the resonator 310 to have a characteristic of a metamaterial. A metamaterial is a material having an electrical characteristic that is not found in nature, and thus may have an artificially designed structure. All materials existing in nature have a permittivity and a magnetic permeability, and most materials have a positive permittivity and/or a positive magnetic permeability.

A right-hand rule may be applied to an electric field, a magnetic field, and a Poynting vector in most materials, so the corresponding materials may be referred to as right-handed materials (RHMs). However, a metamaterial having a permittivity and/or a magnetic permeability that is not found in nature may be classified into an epsilon negative (ENG) material, a mu negative (MNG) material, a double negative (DNG) material, a negative refractive index (NRI) material, a left-handed (LH) material, and any other metamaterial classification known to one of ordinary skill in the art based on a sign of the permittivity of the metamaterial and a sign of the magnetic permeability of the metamaterial.

If the capacitor 350 is a lumped element capacitor and a capacitance of the capacitor 350 is appropriately determined, the resonator 310 may have a characteristic of a metamaterial. If the resonator 310 is caused to have a negative magnetic permeability by appropriately adjusting the capacitance of the capacitor 350, the resonator 310 may also be referred to as an MNG resonator. Various criteria may be applied to determine the capacitance of the capacitor 350. For example, the various criteria may include a criterion for enabling the resonator 310 to have the characteristic of the metamaterial, a criterion for enabling the resonator 310 to have a negative magnetic permeability at a target frequency, a criterion for enabling the resonator 310 to have a zeroth-order resonance characteristic at the target frequency, and any other suitable criterion. Based on any one criterion or any combination of the aforementioned criteria, the capacitance of the capacitor 350 may be appropriately determined.

The resonator 310, hereinafter referred to as the MNG resonator 310, may have a zeroth-order resonance characteristic of having a resonant frequency when a propagation constant is "0". When the MNG resonator 310 has the zeroth-order resonance characteristic, the resonant frequency is independent of a physical size of the MNG resonator 310. The resonant frequency of the MNG resonator 310 having the zeroth-order characteristic may be changed without changing the physical size of the MNG resonator 310 by changing the capacitance of the capacitor 350.

In a near field, the electric field is concentrated in the capacitor 350 inserted into the first transmission line, causing the magnetic field to become dominant in the near field. The MNG resonator 310 has a relatively high Q-factor when the capacitor 350 is a lumped element capacitor, thereby increasing a wireless power transmission efficiency. The Q-factor indicates a level of an ohmic loss or a ratio of a reactance with respect to a resistance in the wireless power transmission. As will be understood by one of ordinary skill in the art, the wireless power transmission efficiency will increase as the Q-factor increases.

Although not illustrated in FIG. 3B, a magnetic core passing through the MNG resonator 310 may be provided to increase a wireless power transmission distance.

Referring to FIG. 3B, the feeder 320 includes a second transmission line (not identified by a reference numeral in FIG. 3B, but formed by various elements in FIG. 3B as discussed below), a third conductor 371, a fourth conductor 372, a fifth conductor 381, and a sixth conductor 382.

The second transmission line includes a third signal conducting portion 361 and a fourth signal conducting portion 362 disposed in an upper portion of the second transmission line, and a second ground conducting portion 363 disposed in a lower portion of the second transmission line. The third signal conducting portion 361 and the fourth signal conducting portion 362 are disposed to face the second ground conducting portion 363. A current flows through the third signal conducting portion 361 and the fourth signal conducting portion 362.

Additionally, as shown in FIG. 3B, one end of the third signal conducting portion 361 is connected to one end of the third conductor 371, the other end of the third signal conducting portion 361 is connected to one end of the fifth conductor 381, and the other end of the third conductor 371 is connected to one end of the second ground conducting portion 363. One end of the fourth signal conducting portion 362 is connected to one end of the fourth conductor 372, the other end of the fourth signal conducting portion 362 is connected to one end of the sixth conductor 382, and the other end of the fourth conductor 372 is connected to the other end of the second ground conducting portion 363. The other end of the fifth conductor 381 is connected to the first signal conducting portion 331 at or near where the first signal conducting portion 331 is connected to one end of the capacitor 350, and the other end of the sixth conductor 382 is connected to the second signal conducting portion 332 at or near where the second signal conducting portion 332 is connected to the other end of the capacitor 350. Thus, the fifth conductor 381 and the sixth conductor 382 are connected in parallel with both ends of the capacitor 350. The fifth conductor 381 and the sixth conductor 382 may be used as input ports to receive an RF signal as an input.

Accordingly, the third signal conducting portion 361, the fourth signal conducting portion 362, the second ground conducting portion 363, the third conductor 371, the fourth conductor 372, the fifth conductor 381, the sixth conductor 382, and the resonator 310 are connected to one another, causing the resonator 310 and the feeder 320 to have an electrically closed loop structure. The term "loop structure" includes a polygonal structure, a circular structure, a rectangular structure, and any other geometrical structure that is closed, i.e., a geometrical structure that does not have any opening in its perimeter. The expression "having a loop structure" indicates a structure that is electrically closed.

If an RF signal is input to the fifth conductor 381 or the sixth conductor 382, an input current flows in the feeder 320 and the resonator 310, generating a magnetic field that induces a current in the resonator 310. A direction of the input current flowing in the feeder 320 is the same as a direction of the induced current flowing in the resonator 310, thereby causing a strength of a total magnetic field in the resonator 310 to increase inside the feeder 320, but decrease outside the feeder 320.

An input impedance is determined by an area of a region between the resonator 310 and the feeder 320. Accordingly, a separate matching network used to match the input impedance to an output impedance of a power amplifier may not be needed. However, even if a matching network is used, the input impedance may be adjusted by adjusting a size of the feeder 320, and accordingly a structure of the matching network may be simplified. The simplified structure of the matching network reduces a matching loss of the matching network.

The second transmission line, the third conductor 371, the fourth conductor 372, the fifth conductor 381, and the sixth conductor 382 of the feeder 320 may have the same structure as the resonator 310. For example, if the resonator 310 has a loop structure, the feeder 320 may also have a loop structure. As another example, if the resonator 310 has a circular structure, the feeder 320 may also have a circular structure.

Figure 4A:
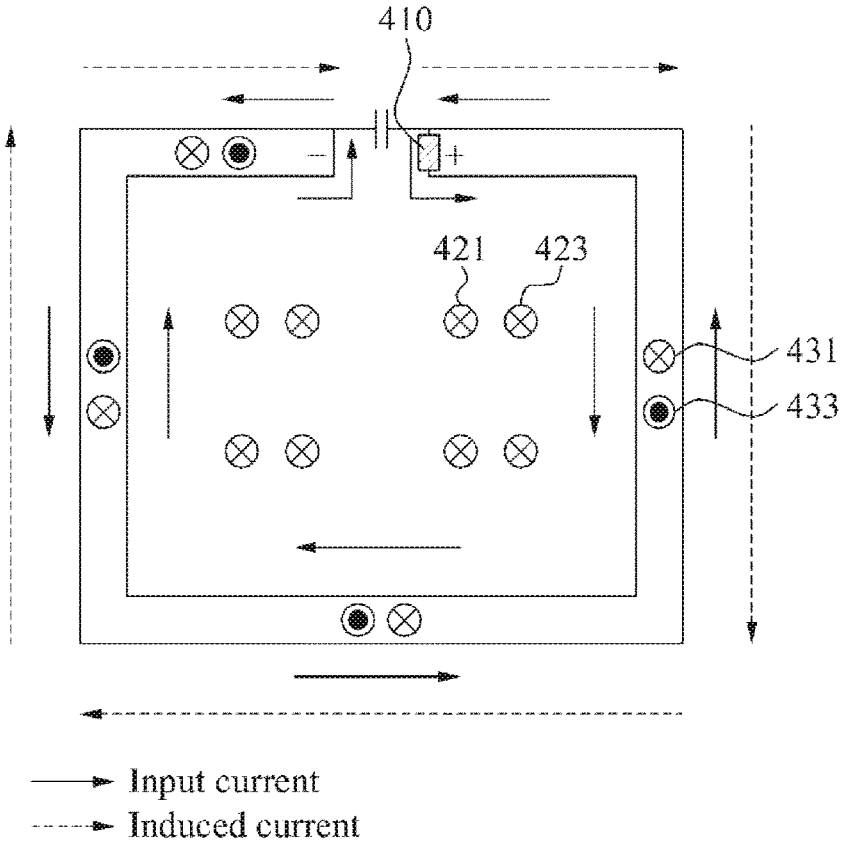
FIG. 4A illustrates an example of a distribution of a magnetic field inside a resonator produced by feeding a feeder.

FIG. 4A illustrates an example of a distribution of a magnetic field inside a resonator produced by feeding a feeder. FIG. 4A more simply illustrates the resonator 310 and the feeder 320 of FIGS. 3A and 3B, and the names and the reference numerals of the various elements in FIG. 3B will be used in the following description of FIG. 4A for ease of description.

A feeding operation may be an operation of supplying a power to a source resonator in wireless power transmission, or an operation of supplying an AC power to a rectifier in the wireless power transmission. FIG. 4A illustrates a direction of an input current flowing in the feeder 320, and a direction of an induced current flowing in the source resonator 310. Additionally, FIG. 4A illustrates a direction of a magnetic field generated by the input current of the feeder 320, and a direction of a magnetic field generated by the induced current of the resonator 310.

Referring to FIG. 4A, the fifth conductor 381 or the sixth conductor 382 of the feeder 320 of FIG. 3A may be used as an input port 410. In FIG. 4A, the sixth conductor 382 of the feeder 320 is being used as the input port 410. The input port 410 receives an RF signal as an input. The RF signal may be output from a power amplifier. The power amplifier may increase or decrease an amplitude of the RF signal based on a power requirement of a target. The RF signal received by the input port 410 is represented in FIG. 4A as an input current flowing in the feeder 320. The input current flows in a clockwise direction in the feeder 320 along the second transmission line of the feeder 320. The fifth conductor 381 and the sixth conductor 382 of the feeder 320 are electrically connected to the resonator 310. More particularly, the fifth conductor 381 of the feeder 320 is connected to the first signal conducting portion 331 of the resonator 310, and the sixth conductor 382 of the feeder 320 is connected to the second signal conducting portion 332 of the resonator 310. Accordingly, the input current flows in both the resonator 310 and the feeder 320. The input current flows in a counterclockwise direction in the resonator 310 along the first transmission line of the resonator 310. The input current flowing in the resonator 310 generates a magnetic field, and the magnetic field induces a current in the resonator 310. The induced current flows in a clockwise direction in the resonator 310 along the first transmission line of the resonator 310. The induced current in the resonator 310 supplies energy to the capacitor 311 of the resonator 310, and also generates a magnetic field. In this example, the input current flowing in the feeder 320 and the resonator 310 is indicated by the solid lines with arrowheads in FIG. 4A, and the induced current flowing in the resonator 310 is indicated by the dashed lines with arrowheads in FIG. 4A.

A direction of a magnetic field generated by a current is determined based on the right-hand rule. As illustrated in FIG. 4A, inside the feeder 320, a direction 421 of the magnetic field generated by the input current flowing in the feeder 320 is the same as a direction 423 of the magnetic field generated by the induced current flowing in the resonator 310. Accordingly, the strength of the total magnetic field increases inside the feeder 320.

In contrast, as illustrated in FIG. 4A, in a region between the feeder 320 and the resonator 310, a direction 433 of the magnetic field generated by the input current flowing in the feeder 320 is opposite to a direction 431 of the magnetic field generated by the induced current flowing in the source resonator 310. Accordingly, the strength of the total magnetic field decreases in the region between the feeder 320 and the resonator 310.

Typically, in a resonator having a loop structure, a strength of a magnetic field decreases in the center of the resonator, and increases near an outer periphery of the resonator. However, referring to FIG. 4A, since the feeder 320 is electrically connected to both ends of the capacitor 311 of the resonator 310, the direction of the induced current in the resonator 310 is the same as the direction of the input current in the feeder 320. Since the direction of the induced current in the resonator 310 is the same as the direction of the input current in the feeder 320, the strength of the total magnetic field increases inside the feeder 320, and decreases outside the feeder 320. As a result, due to the feeder 320, the strength of the total magnetic field increases in the center of the resonator having the loop structure, and decreases near the outer periphery of the resonator, thereby compensating for the normal characteristic of the resonator 310 having the loop structure in which the strength of the magnetic field decreases in the center of the resonator 310, and increases near the outer periphery of the resonator 310. Thus, the strength of the total magnetic field may be constant inside the resonator 310.

A wireless power transmission efficiency of transmitting a power from a source resonator to a target resonator is proportional to the strength of the total magnetic field generated in the source resonator. Accordingly, when the strength of the total magnetic field increases in the center of the source resonator, the wireless power transmission efficiency also increases.

Figure 4B:
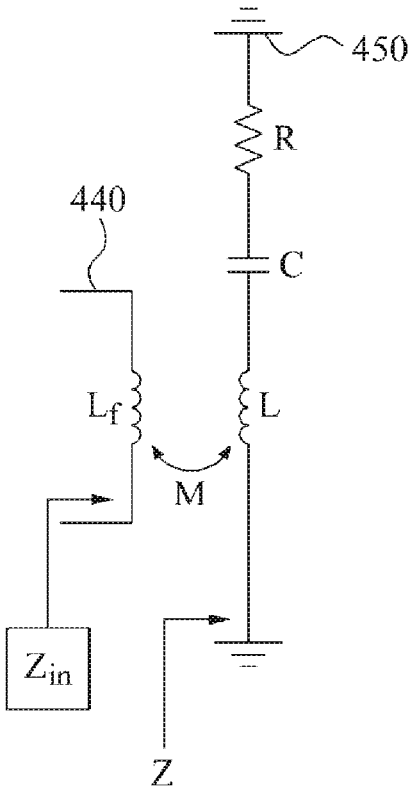
FIG. 4B illustrates an example of equivalent circuits of a feeder and a resonator.

FIG. 4B illustrates an example of equivalent circuits of a feeder and a resonator.

Referring to FIG. 4B, a feeder 440 and a resonator 450 may be represented by the equivalent circuits in FIG. 4B. The feeder 440 is represented as an inductor having an inductance $L_f$, and the resonator 450 is represented as a series connection of an inductor having an inductance L coupled to the inductance $L_f$ of the feeder 440 by a mutual inductance M, a capacitor having a capacitance C, and a resistor having a resistance R. An example of an input impedance $Z_{in}$ viewed in a direction from the feeder 440 to the resonator 450 may be expressed by the following Equation 1:

$$Z_{in} = \frac{(\omega M)^2}{Z} \tag{1}$$

In Equation 1, M denotes a mutual inductance between the feeder 440 and the resonator 450, ω denotes a resonant frequency of the feeder 440 and the resonator 450, and Z denotes an impedance viewed in a direction from the resonator 450 to a target. As can be seen from Equation 1, the input impedance $Z_{in}$ is proportional to the square of the mutual inductance M. Accordingly, the input impedance $Z_{in}$ may be adjusted by adjusting the mutual inductance M between the feeder 440 and the resonator 450. The mutual inductance M depends on an area of a region between the feeder 440 and the resonator 450. The area of the region between the feeder 440 and the resonator 450 may be adjusted by adjusting a size of the feeder 440, thereby adjusting the mutual inductance M and the input impedance $Z_{in}$. Since the input impedance $Z_{in}$ may be adjusted by adjusting the size of the feeder 440, it may be unnecessary to use a separate matching network to perform impedance matching with an output impedance of a power amplifier.

In the resonator 450 and the feeder 440 included in a wireless power reception apparatus, a magnetic field may be distributed as illustrated in FIG. 4A. The resonator 450 may operate as a target resonator 450. For example, the target resonator 450 may receive a wireless power from a source resonator via a magnetic coupling with the source resonator. The received wireless power induces a current in the target resonator 450. The induced current in the target resonator 450 generates a magnetic field, which induces a current in the feeder 440. If the target resonator 450 is connected to the feeder 440 as illustrated in FIG. 4A, a direction of the induced current flowing in the target resonator 450 will be the same as a direction of the induced current flowing in the feeder. Accordingly, for the reasons discussed above in connection with FIG. 4A, the strength of the total magnetic field will increase inside the feeder 440, but will decrease in a region between the feeder 440 and the target resonator 450.

Figure 5:
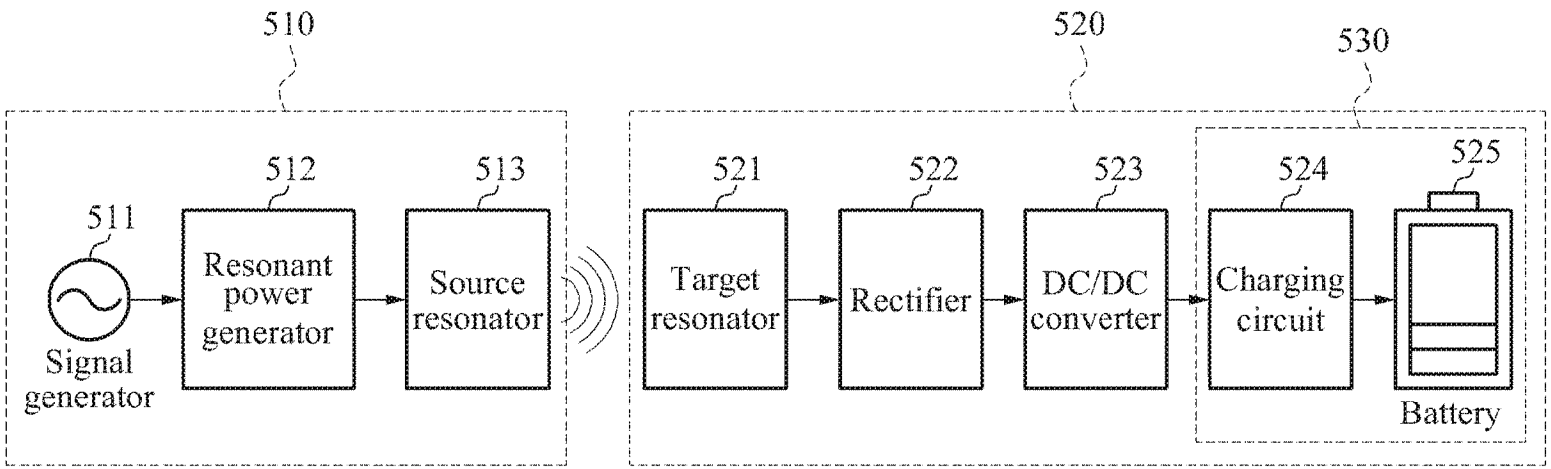
FIG. 5 illustrates an example of a wireless power transmission and reception system.

FIG. 5 illustrates an example of a wireless power transmission and reception system.

Referring to FIG. 5, the wireless power transmission and reception system includes a wireless power transmitter 510, a wireless power receiver 520, and a load 530.

The wireless power transmitter 510 includes a signal generator 511, a resonant power generator 512, and a source resonator 513.

The signal generator 511 generates a signal for wireless power transmission. The signal may have a predetermined frequency. In one example, the signal may be an AC voltage having a frequency in a band of tens of Hz.

The resonant power generator 512 differentially inputs a first input signal and a second input signal to the source resonator 513, and cancels a harmonic component of an output power. The resonant power generator 512 includes a first power amplifier and a second power amplifier. In one example, the first power amplifier generates the first input signal by amplifying the signal generated by the signal generator 511, and the second power amplifier generates the second input signal by amplifying the signal generated by the signal generator 511. In this example, the first input signal and the second input signal have a 180 degree phase difference. Descriptions pertaining to the resonant power generator 512 will be provided with reference to FIGS. 6A and 6B.

The source resonator 513 transmits the output power from which the harmonic component has been cancelled to a target resonator 521 of the wireless power receiver 520 by resonating with the target resonator 521. The source resonator 513 transmits, to the target resonator 521, the output power generated based on the first input signal and the second input signal differentially input to the source resonator 513 as electromagnetic energy. For example, the source resonator 513 transmits the output power to the wireless power receiver 520 via a magnetic coupling with the target resonator 521.

The wireless power receiver 520 includes the target resonator 521, a rectifier 522, and a DC/DC converter 523.

The target resonator 521 receives the electromagnetic energy transmitted from the source resonator 513. For example, the target resonator 521 receives the output power from the wireless power transmitter 510 via a magnetic coupling with the source resonator 513.

The target resonator 521 generates a signal by receiving the power transmitted from the source resonator 513 of the wireless power transmitter 510. The generated signal may be an AC voltage. The target resonator 521 outputs the generated signal. For example, an AC power or an AC voltage may be output from the target resonator 521.

The rectifier 522 generates a rectified signal by rectifying the generated signal output from the target resonator 521.

The rectifier 522 outputs the rectified signal to the DC/DC converter 523. The rectifier 522 converts the AC power or the AC voltage output from the target resonator 521 to a stable DC voltage.

The DC/DC converter 523 generates a charging power by changing a voltage level of the rectified signal.

The load 530 consumes a power. In the example in FIG. 5, the load 530 is a portion of the wireless power receiver 520, but the load 530 may be separate from the wireless power receiver 520. The load 530 is a device to consume the power wirelessly received from the wireless power receiver 520. For example, the load 530 may be a mobile device.

The load 530 includes a charging circuit 531 and a battery 532. The charging circuit 531 adjusts a voltage level and a current level of a charging power based on a charging state of the battery 532 for a stable charging operation of the battery 532. The charging circuit 531 sets a constant charging current based on a capacity of the battery 532, and provides a stable power to the battery 532 based on the setting of the constant charging current.

The battery 532 is provided with the charging power, and charges by storing a current of the provided charging power in the battery 532.

Figure 6A:
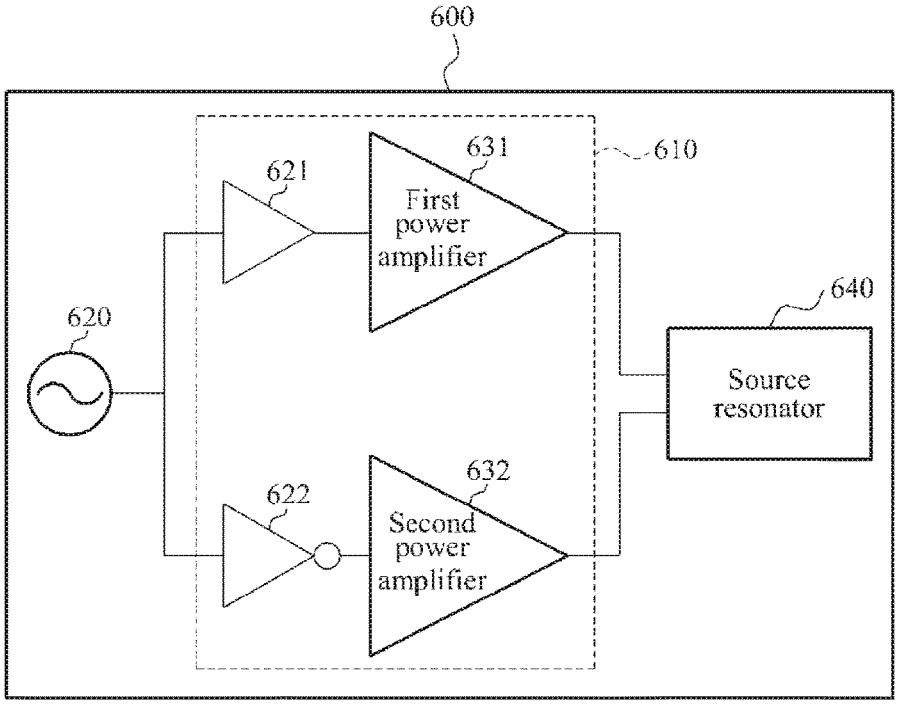
FIGS. 6A and 6B illustrate examples of a wireless power transmitter.
Figure 6B:
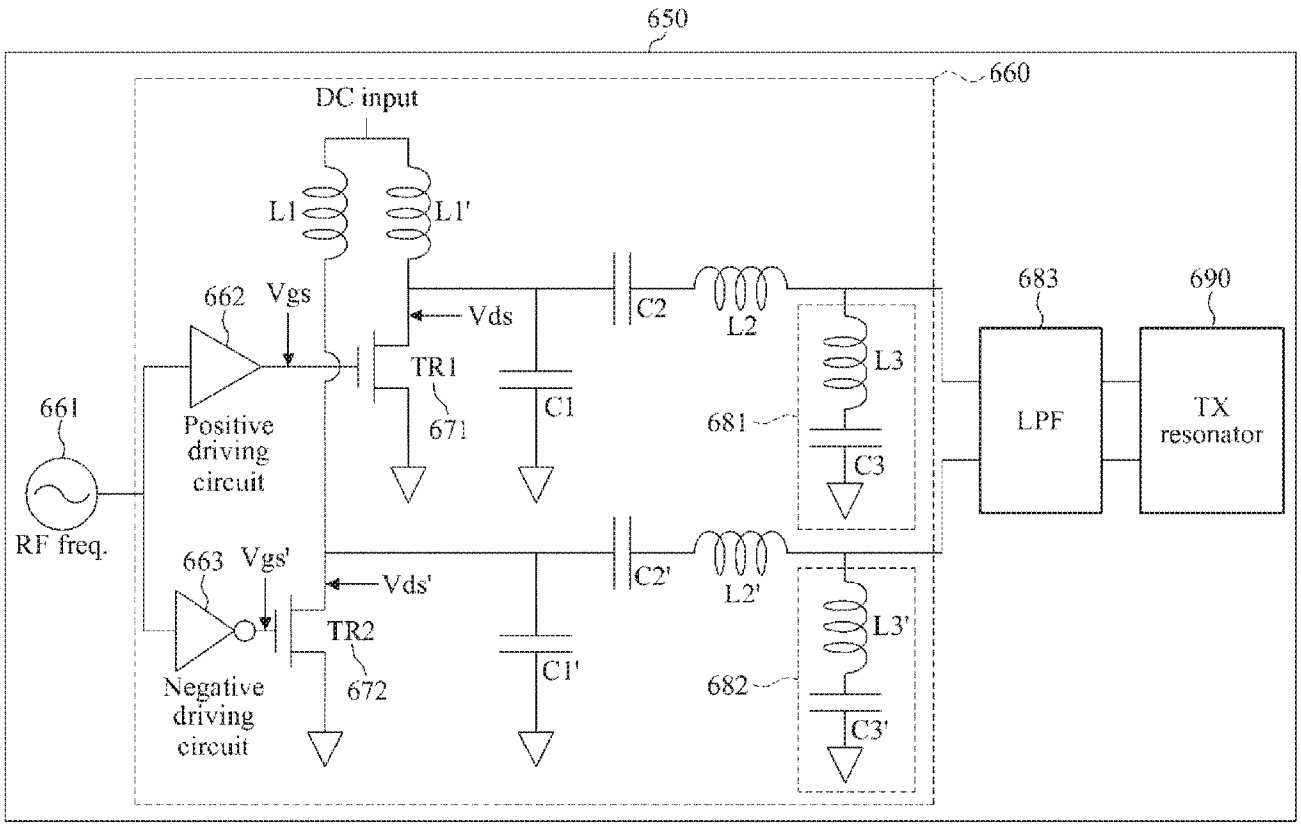

FIGS. 6A and 6B illustrate examples of a wireless power transmitter 600.

Referring to FIG. 6A, the wireless power transmitter 600 includes a signal generator 620, a first driving circuit 621, a second driving circuit 622, a first power amplifier 631, a second power amplifier 632, and a source resonator 640. The first driving circuit 621, the second driving circuit 622, the first power amplifier 631, and the second power amplifier 632 are included in a resonant power generator 610.

The signal generator 620 generates a signal for wireless power transmission. A signal may have a predetermined frequency band. For example, the frequency band of the signal may be 6.78 MHz.

The first power amplifier 631 is coupled to the first driving circuit 621, and the second power amplifier 632 is coupled to the second driving circuit 622. In one example, the first driving circuit 621 may be a positive driving circuit, and the second driving circuit 622 may be a negative driving circuit. The first driving circuit 621 and the second driving circuit 622 receive a same signal from the signal generator 620. A first transmission signal output from the first driving circuit 621 and a second transmission signal output the second driving circuit 622 have a 180 degree phase difference. For example, the first driving circuit 621 may not reverse a phase of a signal received from the signal generator 620, and the second driving circuit 622 may reverse a phase of a signal received from the signal generator 620 by 180 degrees.

The first power amplifier 631 amplifies the first transmission signal received from the first driving circuit 621 as a first input signal, and the second power amplifier 632 amplifies the second transmission signal received from the second driving circuit 622 as a second input signal. The first power amplifier 631 and the second power amplifier 632 may each be a Class-E amplifier. The first transmission signal input to the first power amplifier 631 and the second transmission signal input to the second power amplifier 632 have a 180 degree phase difference. Accordingly, the first input signal generated by the first power amplifier 631 and the second input signal generated by the second power amplifier 632 have the 180 degree phase difference.

The first power amplifier 631 and the second power amplifier 632 differentially input the first input signal and the second input signal to a source resonator 640. In one example, the source resonator 640 receives the first input signal and the second input signal via a differential input port having a separate grounding unit. Since the first input signal and the second input signal are differentially input to the source resonator 640, even-order harmonic components are cancelled by common mode rejection among harmonic components of an output power generated by the source resonator 640. In one example, the first power amplifier 631 and the second power amplifier 632 convert a DC voltage provided to the first power amplifier 631 and the second power amplifier 632 to an AC voltage using a reference resonant frequency $F_{Ref}$, and generate a communication power or a charging power to be used in a wireless power receiver.

The source resonator 640 generates the output power based on the first input signal and the second input signal differentially input to the source resonator 640. The even-mode harmonic components of the output power are cancelled by the differentially input first input signal and second input signal. The source resonator 640 transmits the output power from which the even-mode harmonic components have been cancelled to a target resonator of the wireless power receiver by resonating. In one example, the source resonator 640 transmits the output power to the wireless power receiver via a magnetic coupling with the target resonator.

Referring to FIG. 6B, a wireless power transmitter 650 includes a signal generator 661, a resonant power generator 660, a low-pass filter (LPF) 683, and a source resonator 690. The resonant power generator 660 includes a first driving circuit 662, a second driving circuit 663, a first power amplifier, and a second power amplifier.

The first power amplifier and the second power amplifier each include a transistor 671 or 672, a plurality of inductors, and a plurality of capacitors. The first driving circuit 662 and the second driving circuit 663 receive a same signal from the signal generator 661. In one example, a frequency band of a signal received from the signal generator 661 may be 6.78 MHz. The first driving circuit 662 may be a positive driving circuit, and the second driving circuit 663 may be a negative driving circuit. The first driving circuit 662 may not reverse a phase of the signal received from the signal generator 661, and the second driving circuit 663 may reverse a phase of the signal received from the signal generator 661 by 180 degrees.

The first power amplifier receives a first transmission signal output from the first driving circuit 662, and the second power amplifier receives a second transmission signal output from the second driving circuit 663. The first power amplifier and the second power amplifier amplify the first transmission signal and the second transmission signal, and generate a first input signal and a second input signal. In one example, when the first transmission signal and the second transmission signal are provided as voltages, the first transmission signal and the second transmission signal are respectively applied to a transistor 671 of the first power amplifier and a transistor 672 of the second power amplifier as a gate source voltage. The transistor 671 of the first power amplifier outputs a first drain source voltage, for example, Vds, based on a first gate source voltage, for example, Vgs, and the second transistor 672 outputs a second drain source voltage, for example, Vds', based on a second gate source voltage, for example, Vgs'. A phase difference between the first drain source voltage and the second drain source voltage is 180 degrees because a phase difference between the first gate source voltage and the second gate source voltage is 180 degrees.

The first power amplifier generates the first input signal based on the first drain source voltage, and the second power amplifier generates the second input signal based on the second drain source voltage. A phase difference between the first input signal and the second input signal is 180 degrees because the phase difference between the first drain source voltage and the second drain source voltage is 180 degrees. When the first input signal and the second input signal are differentially input to the source resonator 690, even-order harmonic components are cancelled among harmonic components of an output power generated by the source resonator 690 by common mode rejection since the phase difference between the first input signal and the second input signal is 180 degrees.

The first power amplifier and the second power amplifier respectively include a first notch filter 681 and a second notch filter 682. The first notch filter 681 and the second notch filter 682 may each be a third order notch filter. The first notch filter 681 and the second notch filter 682 each include a capacitor and an inductor. The first notch filter 681 and the second notch filter 682 cancel a third harmonic component of an output signal generated by a source resonator 690 based on the first input signal and the second input signal.

The first notch filter 681 and the second notch filter 682 also match an output impedance of the wireless power transmitter 650 to an input impedance of a wireless power receiver. The first notch filter 681 and the second notch filter 682 compensate for impedance mismatching between the source resonator 690 and the target resonator to achieve optimal matching. The first power amplifier and the second power amplifier may not need an additional matching network because the first notch filter 681 and the second notch filter 682 are included in the first power amplifier and the second power amplifier.

The LPF 683 cancels fifth and higher odd-order harmonic components of the first input signal and the second input signal. If the LPF 683 is set to also cancel a third harmonic component of the first input signal and the second input signal, a loss may occur in the first input signal and the second input signal. Accordingly, the loss occurring in the first input signal and the second input signal may be prevented by setting the LPF 683 to cancel the fifth and higher odd-order harmonic components. Since the fifth and higher harmonic components of the first input signal and the second input signal are cancelled by the LPF 683, fifth and higher harmonic components of the output signal generated by the source resonator 690 are cancelled based on the first input signal and the second input signal.

In one example, the LPF 683 may be set to cancel fifth and higher odd-order harmonic components of the first input signal and the second input signal to prevent the loss in the first input signal and the second input signal.

In another example, the LPF 683 may enable the source resonator 690, the first power amplifier, and the second power amplifier to have a load-pull behavior characteristic.

The source resonator 690 receives the first input signal and the second input signal from the first power amplifier and the second power amplifier. In one example, the source resonator 690 receives the first input signal and the second input signal via the differential input port having the separate grounding unit.

As previously described, the third harmonic component of the output power is cancelled by the first notch filter 681 and the second notch filter 682, and the fifth and higher odd-order harmonic components of the output power are cancelled by the LPF 683. The even-order harmonic components of the output power are cancelled from the output signal of the source resonator 690 because the first input signal and the second input signal are differentially input to the source resonator 690. Accordingly, the source resonator 690 transmits, by resonating with the target resonator, the output signal from which the harmonic components are cancelled to the wireless power receiver.

Figure 7:
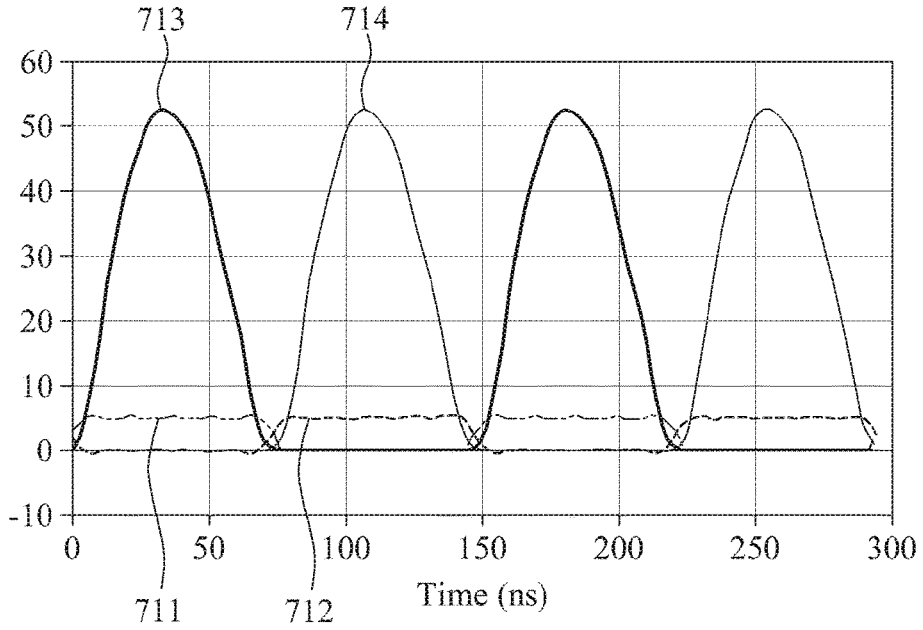
FIG. 7 illustrates an example of a phase difference between a first input signal and a second input signal.

FIG. 7 illustrates an example of a phase difference between a first input signal and a second input signal.

In a graph of FIG. 7, an x axis indicates a time axis and a y axis indicates a voltage value. Referring to FIG. 7, a first power amplifier generates the first input signal based on a first transmission signal output from a first driving circuit, and a second power amplifier generates the second input signal based on a second transmission signal output from a second driving circuit. When the first transmission signal and the second transmission signal are provided as voltages, the first transmission signal is input to a gate source voltage 711, hereinafter also referred to as a first gate source voltage, of a transistor of the first power amplifier, and the second transmission signal is input to a gate source voltage 712, hereinafter also referred to as a second gate source voltage, of a transistor of the second power amplifier. When the first gate source voltage 711 is input to the transistor of the first power amplifier, the transistor of the first power amplifier outputs a first drain source voltage 714, and the transistor of the second power amplifier outputs a second drain source voltage 713. Although a magnitude of the first gate source voltage 711 is equal to a magnitude of the second gate source voltage 712, a phase difference between the first gate source voltage 711 and the second gate source voltage 712 is 180 degrees due to a first driving circuit and a second driving circuit generating the 180 phase difference. Accordingly, the first drain source voltage 714 and the second drain source voltage 713 also have a 180 degree phase difference. The first power amplifier generates a first input signal based on the first drain source voltage 714, and the second power amplifier generates a second input signal based on the second drain source voltage 713. The first input signal and the second input signal have a 180 degree phase difference in response to the phase difference between the first drain source voltage 714 and the second drain source voltage 713 being 180 degrees, and even-order harmonic components of an output signal of a source resonator are cancelled because the first input signal and the second input signal are differentially input to the source resonator.

Figure 8:
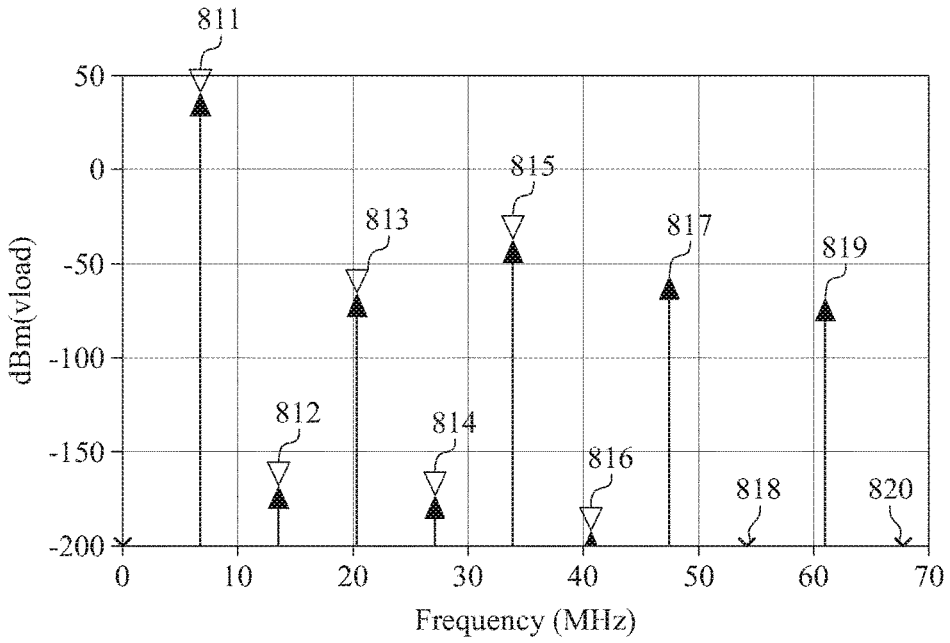
FIG. 8 illustrates an example of harmonic components of an output power.

FIG. 8 illustrates an example of harmonic components 812, 813, 814, 815, 816, 817, 818, 819, and 820 of an output power 811.

In a graph of FIG. 8, an x axis indicates a frequency band of a power and a y axis indicates a magnitude of a power. Referring to FIG. 8, the graph illustrates the output power 811 and a second harmonic component 812 through a tenth harmonic component 820. A first power amplifier generates a first input signal, and a second power amplifier generates a second input signal. In this example, the first input signal and the second input signal have a 180 degree phase difference due to a first driving circuit coupled to the first power amplifier and a second driving circuit coupled to the second power amplifier generating the 180 degree phase difference. The first input signal and the second input signal are differentially input to a source resonator, causing even-order harmonic components, for example, second, fourth, sixth, eighth, and tenth harmonic components, 812, 814, 816, 818, and 820, of an output power of the source resonator to be cancelled. The first power amplifier and the second power amplifier respectively include a first notch filter and a second notch filter. In this example, the first notch filter and the second notch filter are each a third order notch filter. The first notch filter and the second notch filter cancel a third harmonic component 813 of the output power 811. The first input signal and the second input signal pass through an LPF. In this example, the LPF is set to cancel fifth and higher odd-order harmonic components. For example, a fifth harmonic component 815, a seventh harmonic component 817, and a ninth harmonic component 819 are cancelled by the LPF.

Figure 9A:
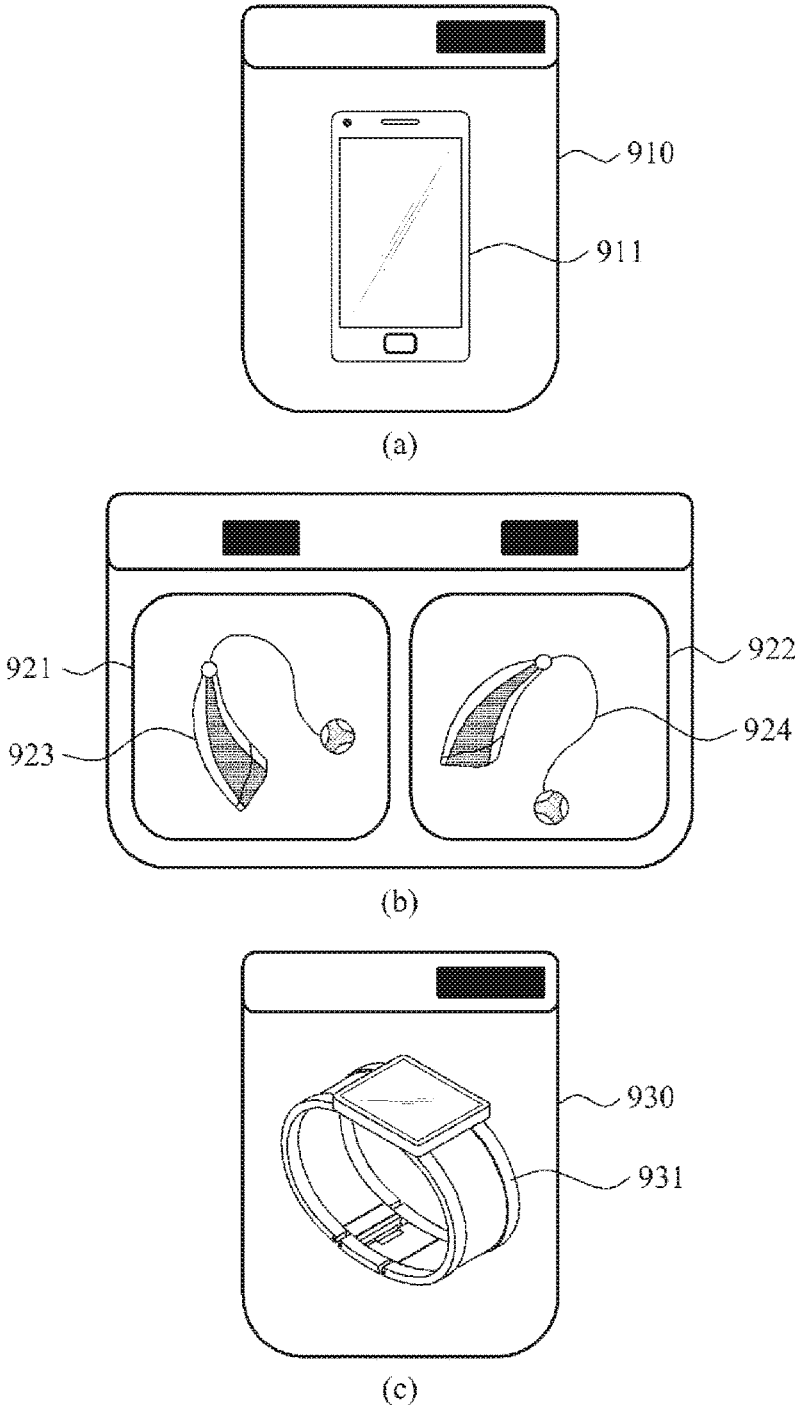
FIGS. 9A and 9B illustrate examples of a unidirectional wireless power transmission and reception system.
Figure 9B:
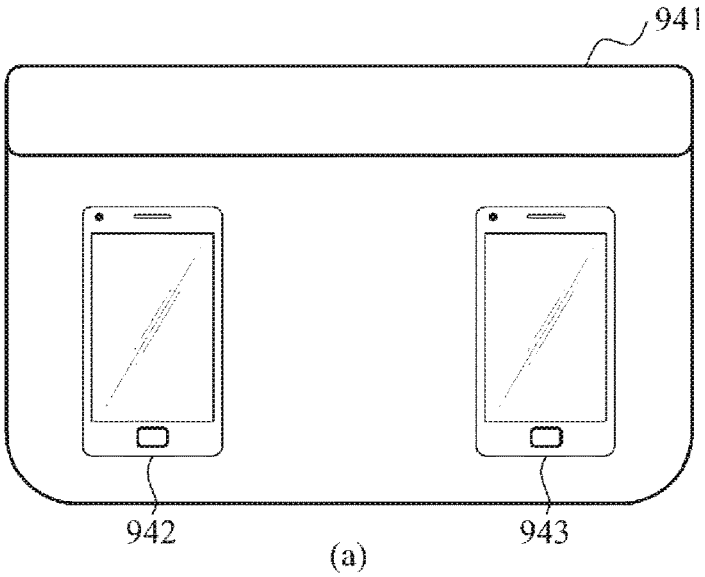
Figure 9B:
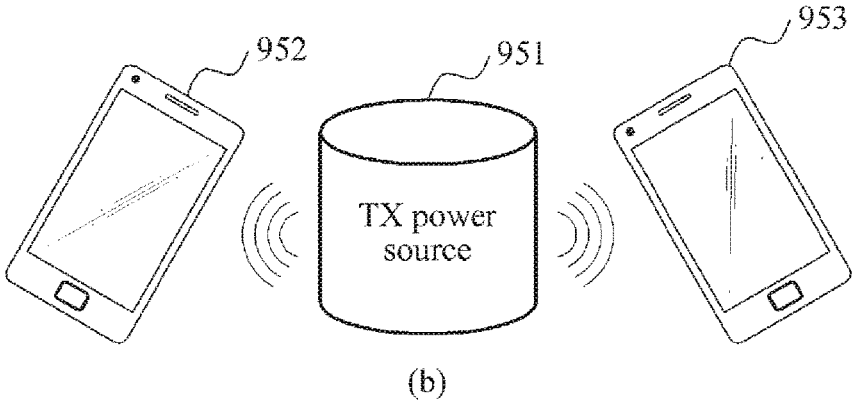

FIGS. 9A and 9B illustrate examples of a unidirectional wireless power transmission and reception system.

Referring to FIG. 9A, (a) illustrates wireless power charging between a pad 910 and a mobile terminal 911, (b) illustrates wireless power charging between pads 921 and 922 and hearing aids 923 and 924, and (c) illustrates wireless power charging between a pad 930 and a smart watch 931.

In (a), a wireless power transmitter is provided in the pad 910. A wireless power receiver is provided in the mobile terminal 911. The pad 910 charges the mobile terminal 911.

In (b), two wireless power transmitters are provided in the first pad 921 and the second pad 922, respectively. The hearing aid 923 is a left ear hearing aid, and the hearing aid 924 is a right ear hearing aid. Two wireless power receivers are provided in the hearing aids 923 and 924, respectively.

In (c), a wireless power transmitter is provided in the pad 930. A wireless power receiver is provided in the smart watch 931. The pad 930 charges the smart watch 931.

In (a) through (c), the wireless power transmitters of the pads include a resonant power generator and a source resonator. The resonant power generator includes a first power amplifier and a second power amplifier. The first power amplifier and the second power amplifier respectively generate a first input signal and a second input signal having a 180 degree phase difference, and differentially input the first input signal and the second input signal to the source resonator, causing even-order harmonic components of an output power of the source resonator to be cancelled. The first power amplifier and the second power amplifier respectively include a first notch filter and a second notch filter. The first notch filter and the second notch filter cancel a third harmonic component of the output power of the source resonator. The wireless power transmitter further includes an LPF, and fifth and higher odd-order harmonic components of the output power are cancelled by the LPF. Accordingly, the wireless power transmitter transmits, to the wireless power receiver, the output power from which the harmonic components have been cancelled.

Referring to FIG. 9B, (a) illustrates wireless power charging between a pad 941 and mobile terminals 942 and 943, and (b) illustrates wireless power charging between a power source 951 and mobile terminals 952 and 953 in a three-dimensional (3D) space.

In (a), a wireless power transmitter is provided in the pad 941. Two wireless power receivers are provided in the mobile terminals 942 and 943, respectively. The pad 941 charges the mobile terminals 942 and 943.

In (b), wireless power transmitters are provided in a power source 951. Two wireless receivers are provided in mobile terminals 952 and 953, respectively. The power source 951 charges the mobile terminals 952 and 953 in a 3D space.

In (a) and (b), the wireless power transmitters of the pad 941 and the power source 951 include a resonant power generator and a source resonator. The resonant power generator includes a first power amplifier and a second power amplifier. A first input signal and a second input signal having a 180 degree phase difference generated by the first power amplifier and the second power amplifier are differentially input to the source resonator, causing even-order harmonic components of an output power of the source resonator to be cancelled, and a third harmonic component of the output power is cancelled by a first notch filter and a second notch filter included in the first power amplifier and the second power amplifier, respectively. Each of the wireless power transmitters further includes an LPF, which cancels fifth and higher odd-order harmonic components of the output power of the source resonator.

Figure 10A:
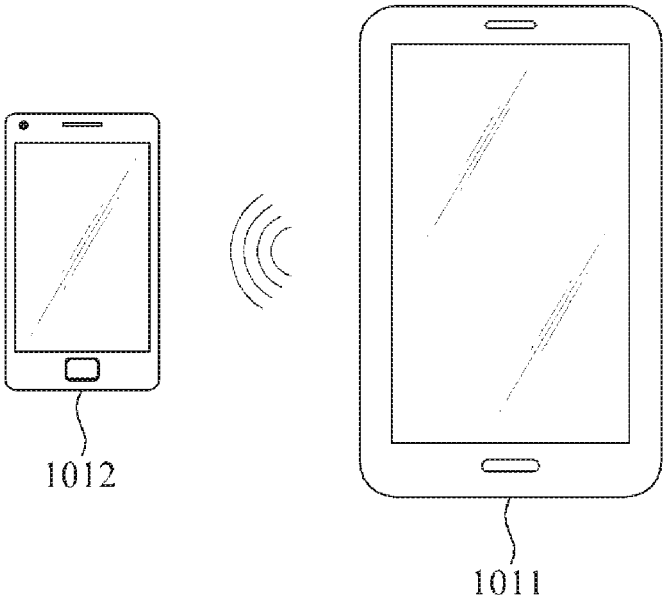
FIGS. 10A through 10C illustrate examples of a bidirectional wireless power transmission and reception system.
Figure 10B:
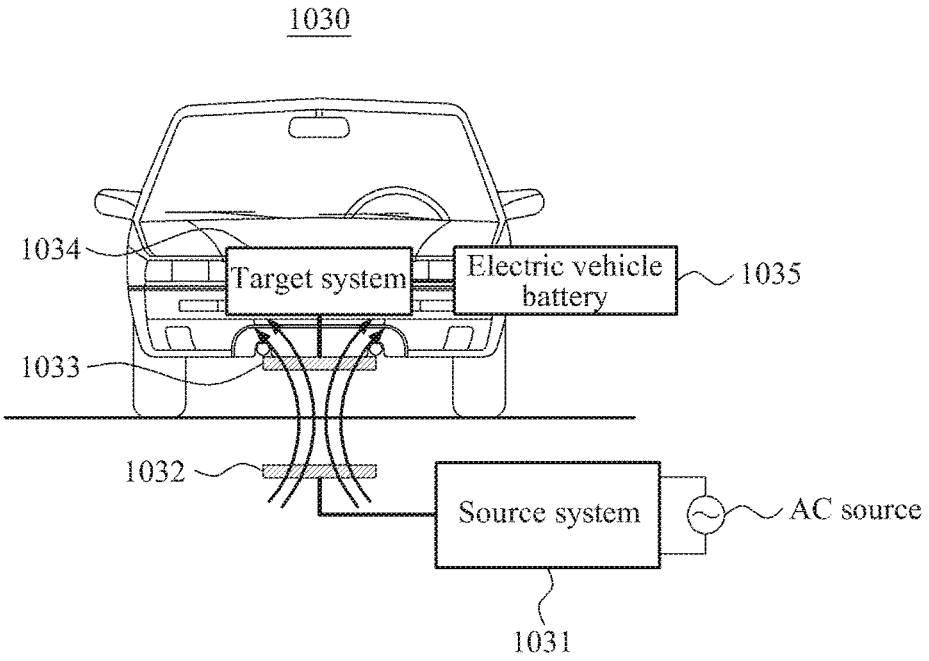
Figure 10C:
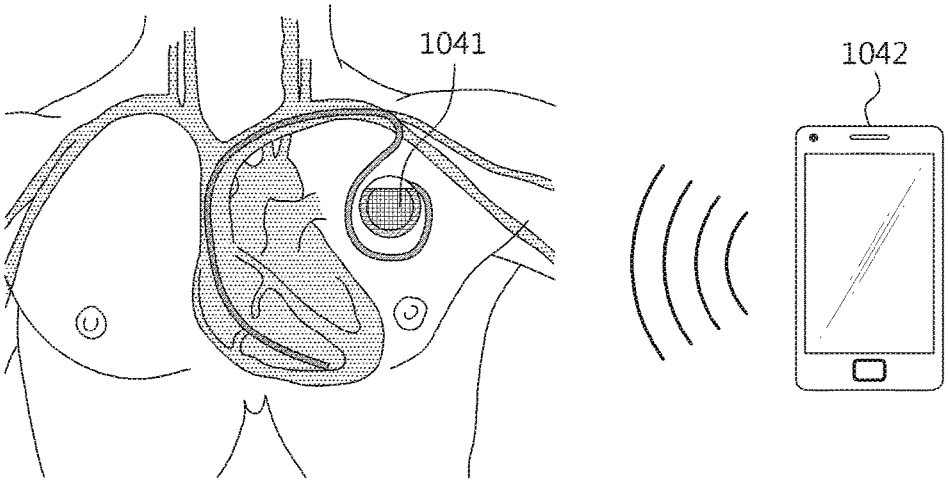
Figure 10C:
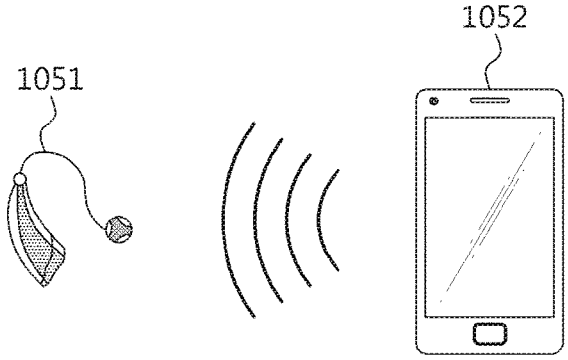

FIGS. 10A through 10C illustrate examples of a bidirectional wireless power transmission and reception system.

Referring to FIG. 10A, mobile terminals 1011 and 1012 each include a wireless power transmitter and a wireless power receiver. The mobile terminal 1011 transmits a power to the mobile terminal 1012, or receives a power from the mobile terminal 1012. The mobile terminal 1012 also transmits a power to the mobile terminal 1011, or receives a power from the mobile terminal 1011.

The wireless power transmitters of the mobile terminals 1011 and 1012 each include a resonant power generator and a source resonator. The resonant power generator includes a first power amplifier and a second power amplifier. A first input signal and a second input signal having a 180 degree phase difference generated by the first power amplifier and the second power amplifier are differentially input to the source resonator, causing even-order harmonic components of an output power of the source resonator to be cancelled, and a third harmonic component of the output power of the source resonator is cancelled by a first notch filter and a second notch filter included in the first power amplifier and the second power amplifier, respectively. Each of the wireless power transmitters further includes an LPF, which cancels fifth and higher harmonic component of the output power of the source resonator. Accordingly, the mobile terminals 1011 and 1012 transmit and receive the output power from which the harmonic components are cancelled.

Referring to FIG. 10B, an electric vehicle charging system 1030 includes a source system 1031, a source resonator 1032, a target resonator 1033, a target system 1034, and an electric vehicle battery 1035.

The electric vehicle charging system 1030 has a structure similar to a structure of the wireless power transmission and reception system of FIG. 5. For example, the electric vehicle charging system 1030 includes a source including the source system 1031 and the source resonator 1032. The electric vehicle charging system 1030 further includes a target including the target resonator 1033 and the target system 1034. In this example, the source system 1030 includes a signal generator and a resonant power generator like the wireless power transmitter 510 of FIG. 5. Also, the target system 1034 includes a target resonator, a rectifier, and a DC/DC converter like the wireless power receiver of FIG. 5.

The resonant power generator of the source system 1031 includes a first power amplifier and a second power amplifier. The first power amplifier and the second power amplifier respectively generate a first input signal and a second input signal having a 180 degree phase difference, and differentially input the first input signal and the second input signal to the source resonator 1032, which cancels even-order harmonic components of an output power of the source resonator 1032. The first power amplifier and the second power amplifier respectively include a first notch filter and a second notch filter. The first notch filter and the second notch filter cancel a third harmonic component of the output power of the source resonator 1032. The source system 1031 further includes an LPF, which cancels fifth and higher odd-order harmonic components of the output power. Accordingly, the source resonator 1032 transmits, to the target resonator 1033, the output power from which the harmonic components have been cancelled.

The source system 1031 generates a power based on a type of a charging vehicle, a capacity of the electric vehicle battery 1035, and a charging state of the electric vehicle battery 1035, and provides the generated power to the target system 1034.

The source system 1031 controls an alignment of the source resonator 1032 to match an alignment of the target resonator 1033. For example, a controller of the source system 1031 controls the alignments by transmitting a message to the target resonator 1034 when the alignment of the source resonator 1032 does not match the alignment of the target resonator 1033.

In this example, the alignments do not match when a position of the target resonator 1033 is not a position at which a maximum magnetic resonance with the source resonator 1032 occurs. For example, when a vehicle is not stopped at a precise position, the source system 1031 instructs the position of the vehicle to be adjusted, and matches the alignment of the source resonator 1032 to the alignment of the target resonator 1033.

The source system 1031 and the target system 1033 transmit and receive an identifier of the vehicle and various messages by communicating with each other.

The electric vehicle battery 1035 is charged by the target system 1034.

The electric vehicle charging system 1030 may use a resonant frequency in a band of a few kHz to tens of MHz.

Referring to FIG. 100, (a) illustrates wireless power charging between an electric device 1041 implanted in a human body and a mobile terminal 1042, and (b) illustrates wireless power charging between a hearing aid 1051 and a mobile terminal 1052.

In (a), a wireless power transmitter and a wireless power receiver are provided in the mobile terminal 1042. A wireless power receiver is provided in the electric device 1041 inserted into the human body. The electric device 1041 implanted in the human body is charged by receiving a power from the mobile terminal 1042.

In (b), a wireless power transmitter and a wireless power receiver are provided in a mobile terminal 1052. A wireless power receiver is provided in a hearing aid 1051. The hearing aid 1051 is charged by receiving a power from the mobile terminal 1052. Various low-power electric devices, such as a Bluetooth® earphone, in addition to the hearing aid 1051, may be charged by receiving a power from the mobile terminal 1052.

The wireless power transmitter in (a) and (b) includes a resonant power generator and a source resonator. The resonant power generator includes a first power amplifier and a second power amplifier. The resonant power generator differentially inputs a first input signal generated in the first power amplifier and a second input signal having a 180 degree phase difference generated in the second power amplifier to the source resonator, which cancels even-order harmonic components of an output power of the source resonator. The first power amplifier and the second power amplifier respectively include a first notch filter and a second notch filter, and the first notch filter and the second notch filter cancel a third harmonic component of the output power of the source resonator. The wireless power transmitter further includes an LPF, and the LPF cancels fifth and higher odd-order harmonic components of the output power of the source resonator.

The source resonator transmits the output power from which the harmonic components have been cancelled to the wireless power receiver by resonating with a target resonator included in the wireless power receiver.

Figure 11:
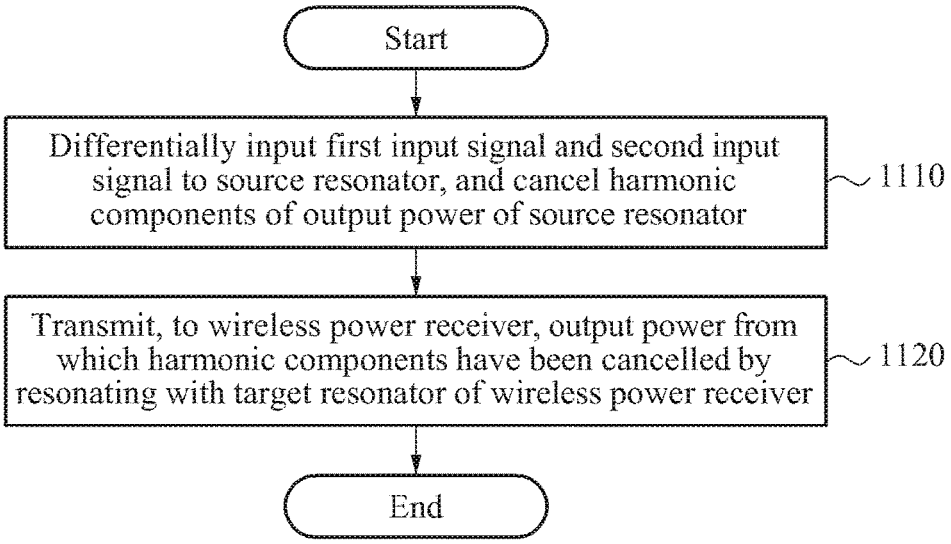
FIG. 11 illustrates an example of a method of wireless power transmission.

FIG. 11 illustrates an example of a method of wireless power transmission.

Referring to FIG. 11, in operation 1110, the method of wireless power transmission includes differentially inputting a first input signal and a second input signal to a source resonator, and cancelling harmonic components of an output power of the source resonator.

In operation 1120, the method of wireless power transmission includes transmitting the output power from which the harmonic components have been cancelled to a wireless power receiver by resonating with a target resonator of the wireless power receiver.

A detailed description of the method of wireless power transmission of FIG. 11 will be omitted for conciseness because the descriptions provided with respect to FIGS. 1 through 10C are also applicable to the method of wireless power transmission of FIG. 11.

The Tx controller 114, the communication units 115 and 124, and the Rx controller 125 in FIG. 1 that perform the various operations described with respect to FIGS. 2A, 2B, 3A, 3B, 4A, and 4B may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the following claims and their equivalents are to be construed as being included in the disclosure.

What is claimed is:

1. A wireless power transmission apparatus comprising:

*a resonant power generator comprising a first power amplifier configured to output a first power signal and a second power amplifier configured to output a second power signal, the first amplifier including a first notch filter configured so that a third harmonic of the first power signal is canceled, and the second amplifier including a second notch filter configured so that a third harmonic of the second power signal is canceled,*

*a low-pass filter (LPF) configured to cancel fifth and higher odd-order harmonic components of the first power signal and the second power signal; and* a source resonator configured to *differentially receive the LPF-filtered first power signal and the LPF-filtered second power signal and wirelessly* transmit [an output] power to a wireless power reception apparatus [by resonating] *based on resonant coupling* with a target resonator of the wireless power reception apparatus, wherein the transmitted [output] power has a predetermined frequency band[;] and

[a resonant power generator comprising first and second notch filters coupled to a low-pass filter (LPF), wherein the first and second notch filters are configured to cancel a third harmonic component of the output power, and the LPF is configured to cancel a fifth or higher odd-order harmonic component of the output power, wherein the resonant power generator is configured to differentially input a first input signal and a second input signal to the source resonator, and]

*the first power signal and the second power signal have a phase difference of 180 degrees to* cancel an even-order harmonic component of the [output] *transmitted* power[, and wherein the source resonator is further configured to transmit the output power from which the third harmonic component and the fifth or higher odd-order harmonic component have been cancelled to the wireless power reception apparatus].

[2. The apparatus of claim 1, wherein the resonant power generator comprises:

a first power amplifier configured to generate the first input signal; and a second power amplifier configured to generate the second input signal.]

3. The apparatus of claim [2] *1*, wherein the resonant power generator further comprises:

a first driving circuit coupled to the first power amplifier; and a second driving circuit coupled to the second power amplifier.

4. The apparatus of claim 3, wherein the first driving circuit and the second driving circuit are configured to [generate] *supply first and second signals having* a 180 degree phase difference [between] *to* the first [input signal] *amplifier* and the second [input signal] *amplifier respectively*.

[5. The apparatus of claim 2, wherein the first power amplifier comprises the first notch filter;

the second power amplifier comprises the second notch filter; and the resonant power generator is further configured to cancel the third harmonic component of the output power using the first notch filter and the second notch filter.]

6. The apparatus of claim [5] *1*, wherein the first notch filter and the second notch filter are configured to match an output impedance of the wireless power transmission apparatus to an input impedance of the wireless power reception apparatus.

[7. The apparatus of claim 5, wherein the LPF coupled to the first and second notch filters of the resonant power generator is further coupled to the source resonator.]

8. The apparatus of claim [2] *1*, wherein the first power amplifier and the second power amplifier are Class-E amplifiers.

9. The apparatus of claim 1, wherein the source resonator is further configured to receive the *LPF-filtered* first [input] *power* signal and the *LPF-filtered* second [input] *power* signal via a differential input port comprising a separate grounding unit.

10. The apparatus of claim 1, wherein the predetermined frequency band [is] *of the transmitted power includes a frequency of* 6.78 MHz.

11. The apparatus of claim 1, wherein the predetermined frequency band is tens of Hz.

12. A wireless power transmission apparatus comprising:

a source resonator configured to *wirelessly* transmit [an output] power to a wireless power reception apparatus [by resonating] *based on resonant coupling* with a target resonator of the wireless power reception apparatus;

a resonant power generator comprising:

a first power amplifier [comprising] *including* a first notch filter and configured to generate a first [input] *power* signal; and a second power amplifier [comprising] *including* a second notch filter and configured to generate a second [input] *power* signal[;],

*a low-pass (LPF) coupled to the source resonator and configured to cancel fifth and higher odd-order harmonic components of the first power signal and the second power signal,*

*wherein the first notch filter and the second notch filter are coupled to the LPF and are configured so that third harmonic components of the first power signal and the second power signal are canceled,* wherein the [resonant power generator] *source resonator* is configured to [cancel an even-order harmonic component of the output power by] differentially [inputting] *receive* the *LPF-filtered* first [input] *power* signal and the *LPF-filtered* second [input] *power* signal [to the source resonator], and

*the first power signal and the second power signal have a phase difference of 180 degrees to* cancel [a third harmonic component of the output power using the first notch filter and the second notch filter; and a low-pass filter (LPF) coupled to the first and second notch filters and configured to cancel a fifth or higher odd-order harmonic component of the output power;

wherein the source resonator is further configured to transmit, to the wireless power reception apparatus, the output power from which the even-order harmonic component, the third harmonic component, and the fifth or higher odd-order harmonic component have been cancelled] *an even-order harmonic component of the transmitted power*.

13. A wireless power transmission method in a wireless power transmission apparatus, the method comprising:

generating, via *a first power amplifier of* a resonant power generator, a first [input] *power* signal [and a second input signal];

*generating, via a second power amplifier of the resonant power generator, a second power signal,*

*canceling, via first and second notch filters, a third harmonic of the first power signal and a third harmonic of the second power signal,*

[differentially inputting, via the resonant power generator, the first input signal and the second input signal to a source resonator and cancelling an even-order harmonic component of the output power;]

cancelling, via a low-pass filter (LPF) [and first and second notch filters coupled to the LPF], [a harmonic component comprising a third harmonic component and a] fifth [or] *and* higher odd-order harmonic [component] *components* of [an output] *the first power signal and the second* power [of the source resonator] *signal*; [and]

*differentially providing the LPF-filtered first power signal and the LPF-filtered second power signal to a source resonator; and*

*wirelessly* transmitting, [via the source resonator, the output] *by the source resonator,* power [from which the harmonic component including the third harmonic component and the fifth or higher odd-order harmonic component has been cancelled] to a wireless power reception apparatus [by resonating] *based on resonant coupling* with a target resonator of the wireless power reception apparatus,

*wherein an even-order harmonic component of the transmitted power is canceled based on the first power signal and the second power signal having a 180 degree phase difference.*

[14. The method of claim 13, wherein the cancelling of the harmonic component of the output power comprises:

generating the first input signal using a first power amplifier; and generating the second input signal using a second power amplifier.]

15. The method of claim [14] *13*, [wherein the cancelling of the harmonic component of the output power further comprises] *further comprising* generating a 180 degree phase difference between the first [input] *power* signal and the second [input] *power* signal using a first driving circuit coupled to the first power amplifier and a second driving circuit coupled to the second power amplifier.

[16. The method of claim 14, wherein the first power amplifier comprises a first notch filter;

the second power amplifier comprises a second notch filter; and the cancelling of the harmonic component of the output power further comprises cancelling the third harmonic component of the output power using the first notch filter and the second notch filter.]

17. The method of claim [16] *13*, wherein the first notch filter and the second notch filter are configured to match an output impedance of the wireless power transmission apparatus to an input impedance of the wireless power reception apparatus.

18. The method of claim [16] *13*, wherein the LPF is further coupled to the source resonator.

19. A non-transitory computer-readable storage medium storing instructions [for controlling] *which, when executed, cause* a computer to *control an electronic device to* perform [the method of claim 13]*:*

*generating, via a first power amplifier of a resonant power generator, a first power signal;*

*generating, via a second power amplifier of a resonant power generator, a second power signal;*

*canceling, via first and second notch filters, a third harmonic of the first power signal and a third harmonic of the second power signal;*

*cancelling, via a low-pass filter (LPF) fifth and higher odd-order harmonic components of the first power signal and the second power signal;*

*differentially providing the filtered first power signal and the filtered second power signal to a source resonator; and*

*wirelessly transmitting, by the source resonator, the power to a wireless power reception apparatus based on resonant coupling with a target resonator of the wireless power reception apparatus,*

*wherein an even-order harmonic component of the transmitted power is canceled based on the first power signal and the second power signal having a 180 degree phase difference.*

* * * * *